United States Patent
Song et al.

(10) Patent No.: US 12,481,430 B2
(45) Date of Patent: Nov. 25, 2025

(54) STORAGE DEVICE SUPPORTING TRIM OPERATION AND STORAGE SYSTEM INCLUDING THE SAME

(71) Applicant: Samsung Electronics Co., Ltd., Suwon-si (KR)

(72) Inventors: Seungho Song, Suwon-si (KR); Jeong-Eun Kim, Suwon-si (KR); Jungho Yun, Suwon-si (KR); Taehyung Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 46 days.

(21) Appl. No.: 18/525,733

(22) Filed: Nov. 30, 2023

(65) Prior Publication Data
US 2024/0201867 A1    Jun. 20, 2024

(30) Foreign Application Priority Data
Dec. 16, 2022    (KR) .................. 10-2022-0177306

(51) Int. Cl.
| | |
|---|---|
| *G06F 3/06* | (2006.01) |
| *G06F 12/12* | (2016.01) |
| *G06F 12/123* | (2016.01) |

(52) U.S. Cl.
CPC .......... *G06F 3/0619* (2013.01); *G06F 3/0659* (2013.01); *G06F 3/0679* (2013.01); *G06F 12/123* (2013.01)

(58) Field of Classification Search
CPC .... G06F 3/0619; G06F 3/0659; G06F 3/0679; G06F 12/123; G06F 2212/7201; G06F 12/0246; G06F 2212/7205; G06F 3/0604; G06F 3/0649; G06F 3/0652; G06F 3/0658; G06F 3/067; G06F 12/0292
See application file for complete search history.

(56) References Cited

U.S. PATENT DOCUMENTS

| | | | |
|---|---|---|---|
| 8,935,503 B2 | 1/2015 | Iizuka | |
| 10,635,346 B2 | 4/2020 | Hodes et al. | |
| 2003/0220949 A1 | 11/2003 | Witt, Jr. et al. | |
| 2020/0387447 A1* | 12/2020 | Byun | G06N 5/04 |

(Continued)

FOREIGN PATENT DOCUMENTS

| | | |
|---|---|---|
| JP | 2007-102688 A | 4/2007 |
| JP | 4383584 B2 | 12/2009 |
| JP | 2011-242862 A | 12/2011 |

*Primary Examiner* — Masud K Khan
(74) *Attorney, Agent, or Firm* — Harness, Dickey & Pierce, P.L.C.

(57) ABSTRACT

A storage device includes a memory device and a solid state drive used as a cache memory for the memory device. The solid state drive includes a storage unit including a plurality of nonvolatile memory cells, a memory controller configured to control the storage unit, and a data management unit configured to manage pieces of data, stored in the storage unit, in order of less recent access time. The data management unit may set at least one of the pieces of data, stored in the storage unit, as cold data based on a data access point in time, and may send an internal trim command for the cold data to the memory controller when a valid data ratio of the storage unit is higher than a reference valid ratio. The memory controller may perform an internal trim operation on the cold data.

19 Claims, 39 Drawing Sheets

(56) References Cited

U.S. PATENT DOCUMENTS

| | | |
|---|---|---|
| 2021/0132803 A1 | 5/2021 | Hong |
| 2021/0303480 A1* | 9/2021 | Keller ................ G06F 12/0824 |
| 2022/0392558 A1* | 12/2022 | Malshe ................ G11C 16/102 |
| 2024/0134531 A1* | 4/2024 | Vankamamidi ....... G06F 3/0685 |

* cited by examiner

FIG. 5A

SSD Management Table(1220)

| SSD Logical ADDR | USI |
|---|---|
| 0 | W |
| 1 | W |
| 2 | W |
| 3 | W |
| 4 | W |
| 5 | E |
| 6 | E |
| 7 | E |
| 8 | E |
| 9 | E |
| 10 | E |

E: Empty
W: Write

FIG. 5B

LRU Management Table(1150)

| SSD Logical ADDR | LRU |
|---|---|
| 0 | 3 |
| 1 | 4 |
| 2 | 5 |
| 3 | 2 |
| 4 | 1 |
| 5 | E |
| 6 | E |
| 7 | E |
| 8 | E |
| 9 | E |
| 10 | E |

FIG. 5C

Mapping Table(1130)

| SSD Logical ADDR | SSD Physical ADDR | WSI |
|---|---|---|
| 0 | Page 0 | V |
| 1 | Page 1 | V |
| 2 | Page 2 | V |
| 3 | Page 3 | V |
| 4 | Page 4 | V |
| 5 | E | E |
| 6 | E | E |
| 7 | E | E |
| 8 | E | E |
| 9 | E | E |
| 10 | E | E |

V: Valid
X: Invalid
E: Empty

FIG. 6A

SSD Management Table(1220)

| SSD Logical ADDR | USI |
|---|---|
| 0 | W |
| 1 | W |
| 2 | W |
| 3 | W |
| 4 | W |
| 5 | W |
| 6 | E |
| 7 | E |
| 8 | E |
| 9 | E |
| 10 | E |

E: Empty
W: Write

FIG. 6B

LRU Management Table(1150)

| SSD Logical ADDR | LRU |
|---|---|
| 0 | 4 |
| 1 | 5 |
| 2 | 6→E |
| 3 | 3 |
| 4 | 2 |
| 5 | 1 |
| 6 | E |
| 7 | E |
| 8 | E |
| 9 | E |
| 10 | E |

→ Internal Trim

FIG. 6C

Mapping Table(1130)

| SSD Logical ADDR | SSD Physical ADDR | WSI |
|---|---|---|
| 0 | Page 0 | v |
| 1 | Page 1 | v |
| 2 | Page 2 | v→x |
| 3 | Page 3 | v |
| 4 | Page 4 | v |
| 5 | Page 5 | v |
| 6 | E | E |
| 7 | E | E |
| 8 | E | E |
| 9 | E | E |
| 10 | E | E |

Row for logical address 2: → Internal Deletion

FIG. 6D

SSD Management Table(1220)

| SSD Logical ADDR | USI |
|---|---|
| 0 | W |
| 1 | W |
| 2 | W→E |
| 3 | W |
| 4 | W |
| 5 | W |
| 6 | E |
| 7 | E |
| 8 | E |
| 9 | E |
| 10 | E |

FIG. 8C

LRU Management Table(1150)

| SSD Logical ADDR | LRU |
|---|---|
| 0 | E |
| 1 | E |
| 2 | E |
| 3 | E |
| ⋮ | ⋮ |
| 9 | E |
| 10 | E |

FIG. 8D

Mapping Table(1130)

| SSD Logical ADDR | SSD Physical ADDR | WSI |
|---|---|---|
| 0 | E | E |
| 1 | E | E |
| 2 | E | E |
| 3 | E | E |
| ⋮ | ⋮ | ⋮ |
| 9 | E | E |
| 10 | E | E |

FIG. 10A

| HDD Management Table(1240) ||
|---|---|
| HDD Logical ADDR | USI |
| 0 | E |
| 1 | E |
| 2 | E |
| 3 | E |
| 4 | W |
| 5 | W |
| ⋮ | ⋮ |
| 997 | E |
| 998 | E |
| 999 | E→W |
| 1000 | E |

FIG. 10B

Cache Management Table(1250)

| SSD Logical ADDR | HDD Logical ADDR |
|---|---|
| 0 | E→999 |
| 1 | E |
| 2 | E |
| 3 | E |
| ⋮ | ⋮ |
| 9 | E |
| 10 | E |

FIG. 10D

LRU Management Table(1150)

| SSD Logical ADDR | LRU |
|---|---|
| 0 | E→1 |
| 1 | E |
| 2 | E |
| 3 | E |
| ... | ... |
| 9 | E |
| 10 | E |

FIG. 10E

Mapping Table(1130)

| SSD Logical ADDR | SSD Physical ADDR | WSI |
|---|---|---|
| 0 | E→Page 0 | E→v |
| 1 | E | E |
| 2 | E | E |
| 3 | E | E |
| ⋮ | ⋮ | ⋮ |
| 9 | E | E |
| 10 | E | E |

FIG. 12A

| HDD Management Table(1240) ||
| HDD Logical ADDR | USI |
| --- | --- |
| 0 | E |
| 1 | E |
| 2 | E |
| 3 | E |
| 4 | W |
| 5 | W |
| ⋮ | ⋮ |
| 997 | E |
| 998 | E |
| 999 | W |
| 1000 | E |

FIG. 12B

Cache Management Table(1250)

| SSD Logical ADDR | HDD Logical ADDR |
|---|---|
| 0 | 999 |
| 1 | E→5 |
| 2 | E |
| 3 | E |
| ⋮ | ⋮ |
| 9 | E |
| 10 | E |

FIG. 12D

LRU Management Table(1150)

| SSD Logical ADDR | LRU |
|---|---|
| 0 | 1→2 |
| 1 | E→1 |
| 2 | E |
| 3 | E |
| ⋮ | ⋮ |
| 9 | E |
| 10 | E |

FIG. 12E

Mapping Table(1130)

| SSD Logical ADDR | SSD Physical ADDR | WSI |
|---|---|---|
| 0 | Page 0 | v |
| 1 | E→Page 1 | E→v |
| 2 | E | E |
| 3 | E | E |
| ⋮ | ⋮ | ⋮ |
| 9 | E | E |
| 10 | E | E |

FIG. 14A

| HDD Logical ADDR | USI |
|---|---|
| 0 | E |
| 1 | E |
| 2 | E |
| 3 | E→W |
| 4 | W |
| 5 | W |
| ⋮ | ⋮ |
| 997 | E |
| 998 | E |
| 999 | W |
| 1000 | E |

HDD Management Table(1240)

FIG. 14B

Cache Management Table(1250)

| SSD Logical ADDR | HDD Logical ADDR |
|---|---|
| 0 | 999 |
| 1 | 5 |
| 2 | 100 |
| 3 | 150 |
| ⋮ | ⋮ |
| 9 | E→3 |
| 10 | E |

FIG. 14C

LRU Management Table(1150)

| SSD Logical ADDR | LRU |
|---|---|
| 0 | 10→E | ← Internal Trim
| 1 | 9 |
| 2 | 8 |
| 3 | 7 |
| ⋮ | ⋮ |
| 9 | E→1 |
| 10 | E |

FIG. 14D

Mapping Table(1130)

| SSD Logical ADDR | SSD Physical ADDR | WSI |
|---|---|---|
| 0 | Page 0 | v→x | ← Internal Deletion
| 1 | Page 1 | v |
| 2 | Page 2 | v |
| 3 | Page 3 | v |
| ⋮ | ⋮ | ⋮ |
| 9 | Page 9 | v |
| 10 | E | E |

FIG. 14F

| Cache Management Table(1250) | |
|---|---|
| SSD Logical ADDR | HDD Logical ADDR |
| 0 | 999→E |
| 1 | 5 |
| 2 | 100 |
| 3 | 150 |
| ⋮ | ⋮ |
| 9 | 3 |
| 10 | E |

FIG. 14G

HDD Management Table(1240)

| HDD Logical ADDR | WSI |
|---|---|
| 0 | E |
| 1 | E |
| 2 | E |
| 3 | W |
| 4 | W |
| 5 | W |
| ⋮ | ⋮ |
| 997 | E |
| 998 | E |
| 999 | W |
| 1000 | E |

FIG. 17

LRU Management Table(1150_1)

| SSD Logical ADDR | LRU | SDI |
|---|---|---|
| 0 | 4 | N |
| 1 | 5→E | N |
| 2 | 6 | S |
| 3 | 3 | N |
| 4 | 2 | N |
| 5 | 1 | N |
| 6 | E | E |
| 7 | E | E |
| 8 | E | E |
| 9 | E | E |
| 10 | E | E |

→ Internal Trim

«STORAGE DEVICE SUPPORTING TRIM OPERATION AND STORAGE SYSTEM INCLUDING THE SAME»

CROSS-REFERENCE TO RELATED APPLICATION(S)

This application claims benefit of priority to Korean Patent Application No. 10-2022-0177306, filed on Dec. 16, 2022, in the Korean Intellectual Property Office, the disclosure of which is incorporated herein by reference in its entirety.

BACKGROUND

The present disclosure relates to a storage device including a nonvolatile memory.

A flash memory, a type of nonvolatile memories, does not support overwriting, unlike a hard disk drive. Therefore, when a storage space of a flash memory becomes insufficient, the flash memory performs a garbage collection operation to secure the storage space. Such a garbage collection operation is accompanied by operations of copying and merging data.

For example, as the amount of valid data stored in the flash memory is increase, a flash memory generally performs more garbage collection operations. This causes operations of copying and merging a large amount of data. As a result, a write amplification factor (WAF) value is increased and performance of a storage device is deteriorated.

SUMMARY

Example embodiments provide a storage device having performance improved by decreasing a write amplification factor (WAF) value.

According to an example embodiment, a storage device includes a memory device and a solid state drive used as a cache memory for the memory device. The solid state drive includes a storage unit including a plurality of nonvolatile memory cells, a memory controller configured to control the storage unit, and a data management unit configured to manage pieces of data, stored in the storage unit, in order of less recent access time. The data management unit is configured to set at least one of the pieces of data, stored in the storage unit, as cold data based on a data access point in time, and may send an internal trim command for the cold data to the memory controller in response to a valid data ratio of the storage unit being higher than a reference valid ratio. The memory controller is configured to perform an internal trim operation on the cold data, among pieces of data stored in the solid state drive, based on the internal trim command, and send internal deletion information, indicating the cold data has been deleted, to a host.

According to an example embodiment, a storage system includes a storage device, including a plurality of nonvolatile memory cells, and a host configured to send a reference valid ratio to the storage device. The storage device is configured to perform an internal trim operation on data stored based on a least recently used (LRU) scheme in response to the reference valid ratio of the storage device being higher than or equal to the valid data ratio, and send information, indicating that target data of the internal trim operation has been deleted, to the host.

According to an example embodiment, a method of operating a storage device including a plurality of nonvolatile memory cells includes setting a reference valid ratio, sorting pieces of valid data, among pieces of data stored in the storage device, based on a data access point in time, performing an internal trim operation on cold data being data accessed less recently than a threshold recency, among the pieces of data stored in the storage device, in response to a valid data ratio of the storage device being higher than or equal to the reference valid ratio, and sending internal deletion information, indicating the cold data has been deleted, to a host.

BRIEF DESCRIPTION OF DRAWINGS

The above and other aspects, features, and advantages of the present disclosure will be more clearly understood from the following detailed description, taken in conjunction with the accompanying drawings.

FIGS. 5A to 5C and 6A to 6D are diagrams provided to describe the internal trim operation of the storage system of FIG. 3 in more detail.

FIGS. 8A to 8D are diagrams illustrating an example of an HDD management table, a cache management table, an LRU management table, and a mapping table managed by the storage system of FIG. 7.

FIGS. 10A to 10E are diagrams illustrating an example of the write operation of FIG. 9 in more detail.

FIGS. 12A to 12E are diagrams illustrating an example of the read operation of FIG. 11 in more detail.

FIGS. 14A to 14G are diagrams provided to describe the internal trim operation of the storage system of FIG. 7 in more detail.

FIG. 17 is a diagram illustrating an example of an LRU management table of the storage system 1000D of FIG. 16.

DETAILED DESCRIPTION

Hereinafter, example embodiments will be described with reference to the accompanying drawings.

[Storage System Supporting Internal Trim Operation]

Figure 1:
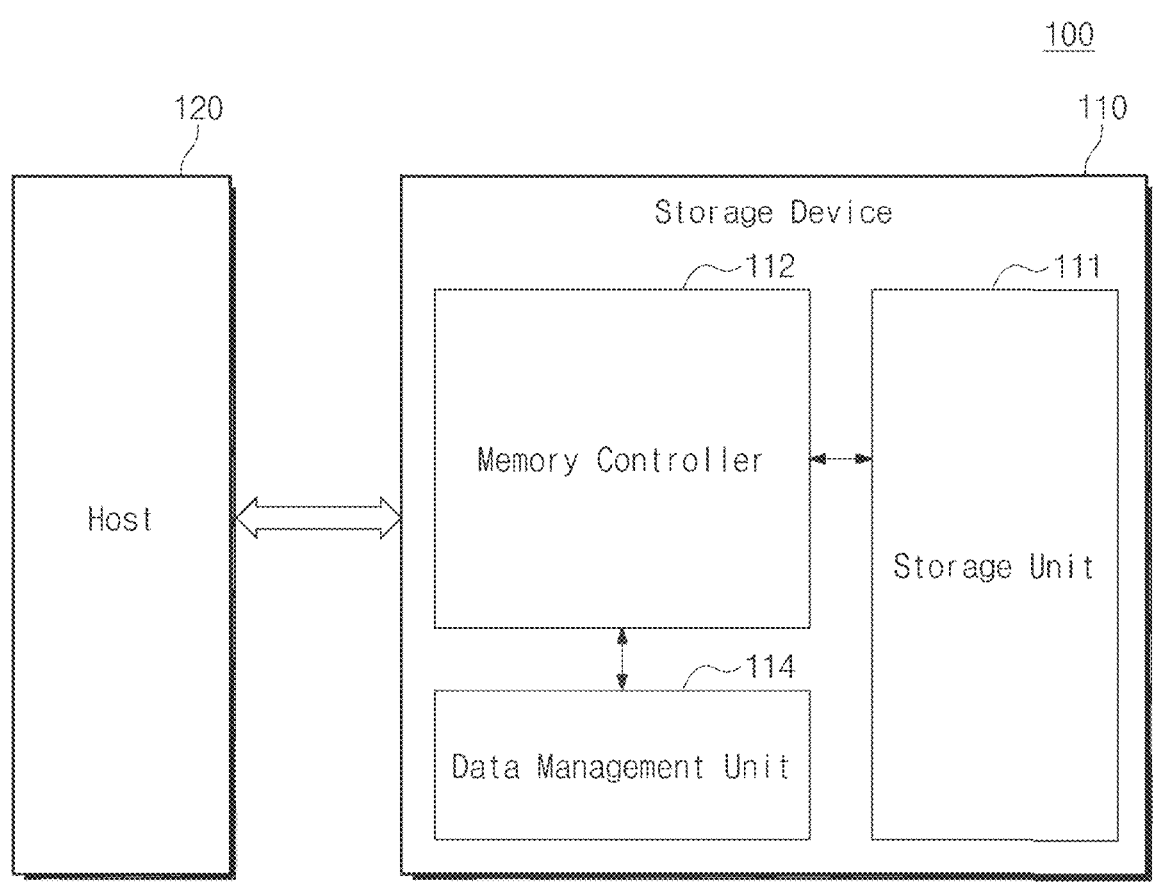
FIG. 1 is a block diagram illustrating a storage system according to an example embodiment.

FIG. 1 is a block diagram illustrating a storage system 100 according to an example embodiment. Referring to FIG. 1, the storage system 100 may include a storage device 110 and a host 120.

The storage device 110 according to an example embodiment may include nonvolatile memories such as flash memories which do not support overwriting. In order to decrease a WAF value, the storage device 110 may perform an internal trim operation on data stored in the nonvolatile memories when a valid data ratio of the stored data is higher than or equal to a predetermined (or alternatively, desired) reference valid ratio (e.g., the internal trim operation may be performed based on a comparison of the valid data ratio of the stored data and the predetermined or desired reference valid ratio). In this case, the internal trim operation may also be referred to as a self-trim operation and may refer to a trim operation performed internally by the storage device 110 while receiving no trim command from the host 120. In this case, the storage device 110 may perform a trim operation on cold data according to a least recently used (LRU) scheme. The term "cold data" refers to data accessed relatively less recently (e.g., less recently than a threshold recency or a threshold time). As described above, when the valid data ratio is higher than or equal to the reference valid rate, a trim operation may be performed on cold data to decrease the WAF value and to improve performance of the storage device 110.

A further detailed description will be provided with reference to FIG. 1. The storage device 110 may include a storage unit 111, a memory controller 112, and a data management unit 114.

The storage unit 111 may include a plurality of memory blocks storing data. All or some of the plurality of memory blocks may include memory cells which do not support overwriting, similarly to a flash memory. Each of (or alternatively, at least one of) the plurality of memory block may have a two-dimensional (2D) structure or a three-dimensional (3D) structure. In a memory block having a 2D structure (or a horizontal structure), memory cells may be formed in a direction, parallel to a substrate (e.g., in a line in the direction parallel to the substrate. In a memory block having a 3D structure (or a vertical structure), memory cells may be formed in a direction, perpendicular to the substrate (e.g., stacked vertically in the direction perpendicular to the substrate).

The memory controller 112 may control the storage unit 111 to store data in the storage unit 111 or to perform a read operation on data stored in the storage unit 111. Also, the memory controller 112 may control the storage unit 111 to perform a delete operation on data stored in the storage unit 111. In addition, the memory controller 112 may control the overall operation of the storage device 110. Restated, the memory controller 112 may control operations of the storage unit 111 and the storage device 110.

The data management unit 114 may manage valid data, among data stored in the storage unit 111. For example, the data management unit 114 may manage data stored in the storage unit 111 using an LRU scheme. The term "the LRU scheme" may refer to a technique to manage valid data, stored in the storage unit 111, in order of less recent access time. For example, the data management unit 114 may sort the valid data stored in the storage unit 111 in order of less recent access time and may set at least one piece of data, accessed least recently or accessed relatively less recently, as cold data.

In an example embodiment, the data management unit 114 may monitor a valid data ratio for the storage unit 111. For example, the data management unit 114 may monitor a ratio of an area, in which valid data is stored, to a total storage area of the storage unit 111. When the valid data ratio of the storage unit 111 is higher than or equal to a reference valid ratio, the data management unit 114 may transmit an internal trim command to the memory controller 112. The internal trim command may include information for designating an area to be deleted, for example, address information on cold data.

The memory controller 112 may perform a trim operation on the cold data in response to the internal trim command. For example, the memory controller 112 may mark a storage area, corresponding to cold data requested to be deleted, as being invalid. The memory controller 112 may initiate or control a garbage collection operation or a delete operation on an area marked as being invalid, for example, during idle time of the storage device 110.

Also, the memory controller 112 may notify the host 120 of information indicating that the cold data has been deleted. The host 120 may receive the information, indicating that the cold data has been deleted, from the memory controller 112. In this case, the host 120 may change metadata of a storage area corresponding to the cold data. For example, the host 120 may change the metadata of the storage area, corresponding to the cold data, to change a state of the corresponding storage area into an empty state.

As described above, the storage device 110 according to an example embodiment may perform a trim operation on cold data when a valid data ratio is higher than or equal to a reference valid ratio. Accordingly, the invalid data ratio may be increased to decrease the number of times of copying or merging data accompanying garbage collection. As a result, as a WAF value is decreased, performance of the storage device 110 may be improved.

Figure 2:
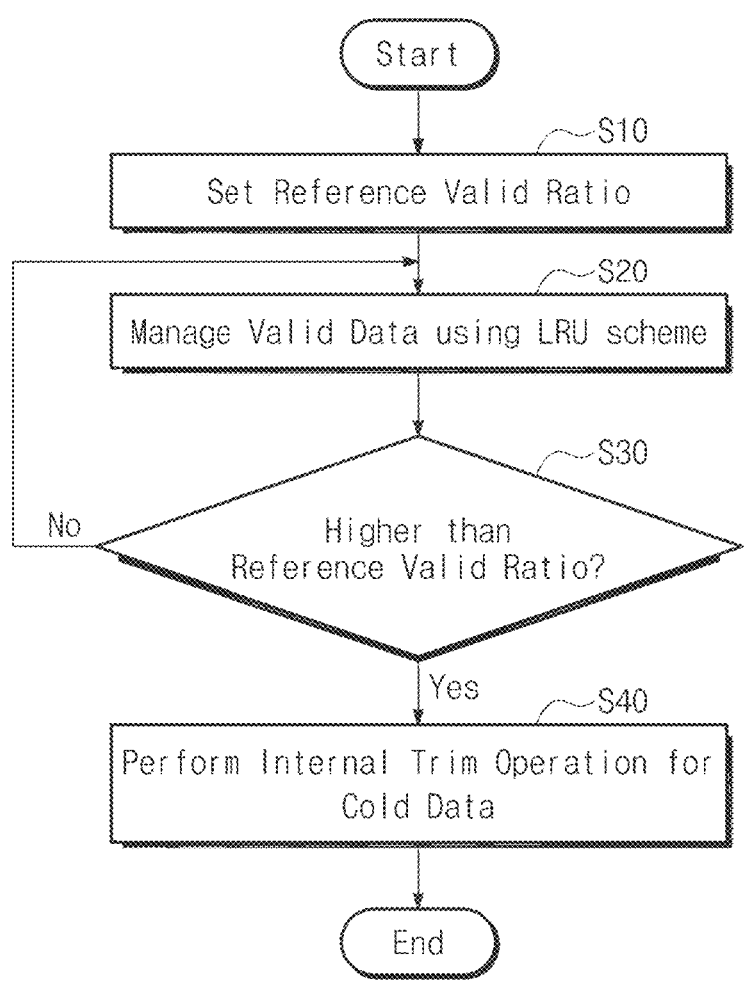
FIG. 2 is a flowchart illustrating an example of a method of operating the storage device of FIG. 1.

FIG. 2 is a flowchart illustrating an example of a method of operating the storage device 110 of FIG. 1.

In operation S10, the storage device 110 may set a reference valid ratio. For example, the storage device 110 may receive information on the reference valid ratio from the host 120 and set the received information as the reference valid ratio. As another example, the storage device 110 may internally set a reference valid ratio.

In operation S20, the storage device 110 may manage valid data, stored in the storage unit 111, using an LRU scheme. For example, the storage device 110 may sort valid data in order of less recent access time and may manage valid data, accessed least recently or accessed relatively less recently (compared to a threshold recency or threshold time), as cold data.

In operation S30, the storage device 110 may determine whether the valid data ratio is higher than the reference valid rate.

In operation S40, when the valid data ratio is higher than the reference valid rate, the storage device 110 may perform an internal trim operation on the cold data to decrease a WAF value. For example, the storage device 110 may mark an area, in which the cold data is stored, to be invalid and may notify the host 120 that the cold data has been deleted. In this case, a garbage collection operation or a delete operation may be performed on the cold data, marked as being invalid, during valid time.

As described above, when the valid data ratio is higher than or equal to than the reference valid ratio, a trim operation may be performed on the cold data to decrease a WAF value and to improve performance of the storage device 110.

The storage system 100 according to example embodiments may be changed or modified in various examples. Hereinafter, various examples according to example embodiments will be described in more detail.

[SSD Performing Internal Trim Operation Based on Valid Data Rate]

Figure 3:
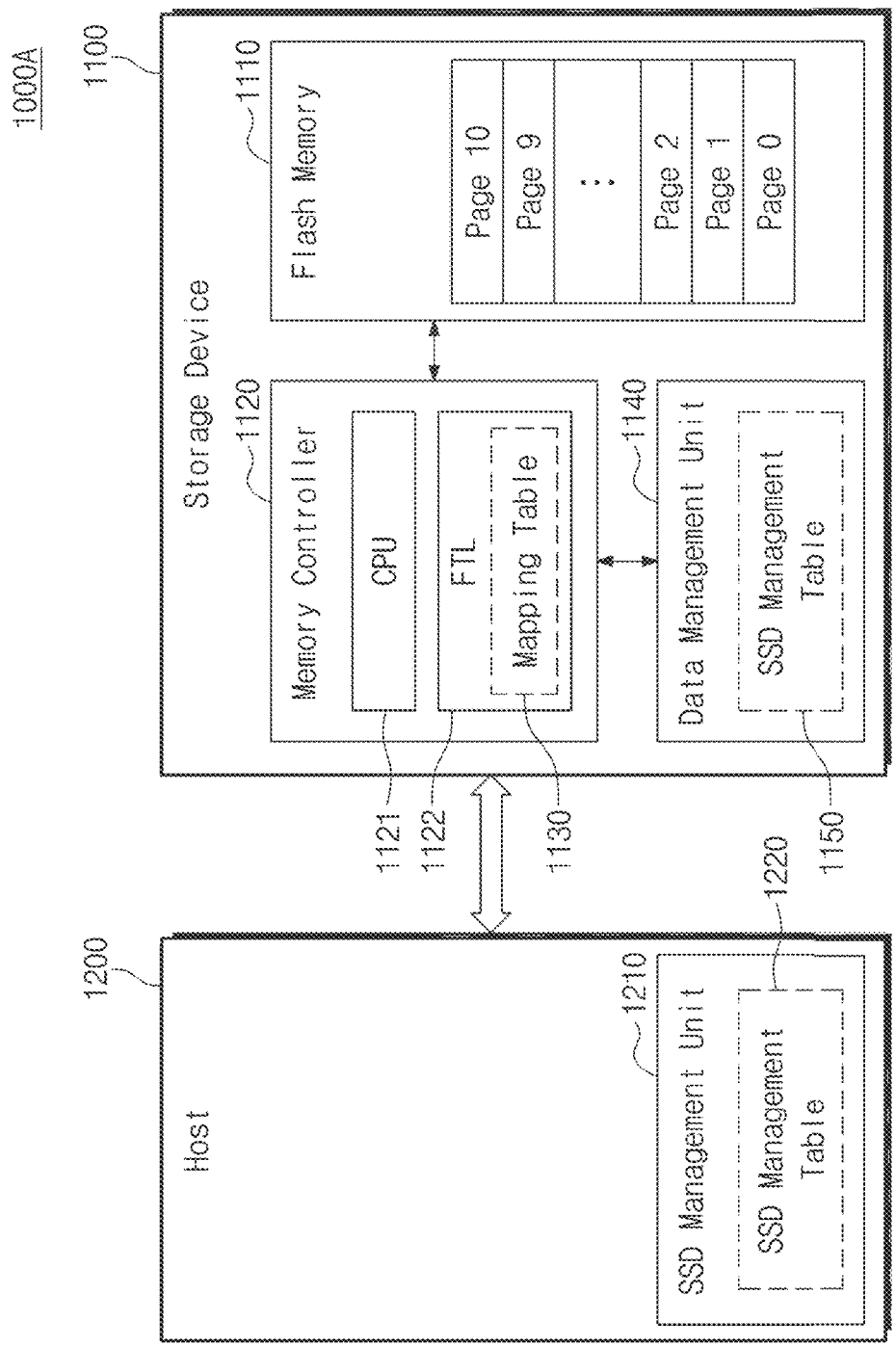
FIG. 3 is a block diagram illustrating a storage system according to an example embodiment.

FIG. 3 is a block diagram illustrating a storage system 1000A according to an example embodiment. FIG. 3 illustrates an example in which the storage device 110 of FIG. 1 is implemented as a solid state drive (SSD). Hereinafter, for ease of description, it will be assumed that data stored in the SSD 1100 is managed in units of pages and an internal trim operation is also performed in units of pages.

Referring to FIG. 3, the storage system 1000A may include an SSD 1100 and a host 1200, and the SSD 1100 may include a flash memory 1110, a memory controller 1120, and a data management unit 1140.

The flash memory 1110 may perform an erase operation, a read operation, or a write operation under the control of the memory controller 1120. The flash memory 1110 may include a plurality of memory blocks, and each of (or alternatively, at least one of) the plurality of memory block may include a plurality of pages. For ease of description, only a single memory block is illustrated in FIG. 3. In FIG. 3, the single memory block is illustrated as including 11 pages Page 0 to Page 10.

Each of (or alternatively, at least one of) the plurality of memory block of the flash memory 1110 may have a 2D structure or a 3D structure. One bit of data, or two or more bits of data may be stored in a single memory cell of the flash memory 1210.

The memory controller 1100 may include a central processing unit (CPU) 1121 and a flash translation layer (FTL) 1122, and the FTL 1122 may include a mapping table 1130.

The CPU 1121 may analyze and process a signal input from the host 1200. The CPU 1121 may analyze and process an internal trim request received from the data management unit 1140. Also, the CPU 1121 may control the overall operation of the SSD 1100.

The FTL 1122 may translate a logical address LA, provided from the host 1200, into a physical address PA on the flash memory 110. For example, the FTL 1122 may manage addresses in units of pages and may translate logical addresses LA of a page unit, received from the host 1200, into physical addresses PA. However, this is merely an example, and the FTL 1122 may manage addresses in units of memory blocks or strings.

In an example embodiment, the FTL 1122 may receive an internal trim command and/or address information on cold data from the data management unit 1140. In this case, the FTL 1122 may mark a page, corresponding to the cold data, as being invalid. A garbage collection operation may be performed on a page marked as being invalid during idle time of the SSD 1100. To this end, the FTL 1122 may include a mapping table 1130.

The mapping table 1130 may manage mapping information between logical addresses and physical addresses of the flash memory 1110. Also, the mapping table 1130 may manage information of an invalid page. For example, the mapping table 1130 may include write state information (hereinafter referred to as "WSI"), and the WSI of the mapping table 1130 may indicate whether each page is in a state in which valid data is stored, in a state in which invalid data is stored, or in an empty state. In FIG. 3, the mapping table 1130 is illustrated as being included in the FTL 1122, but this is merely an example and the mapping table 1130 may be stored in an additional area such as a buffer memory.

The data management unit 1140 may manage valid data, among pieces of data stored in the flash memory 1110. For example, the data management unit 1140 may manage valid data stored in the flash memory 1110 using an LRU scheme.

To this end, the data management unit 1140 may include an LRU management table 1150.

The LRU management table 1150 may manage the valid data, stored in the flash memory 1110, based on data access time. For example, the LRU management table 1150 manages the valid data in units of pages, and may sort pages, in which valid data is stored, in order of less recent access time. For example, among the pages managed by the LRU management table 1150, data stored in a page accessed least recently may be set as cold data. However, this is merely an example, and pieces of data stored in at least two pages accessed least recently, among the pages managed by the LRU management table 1150, may be set as cold data.

In an example embodiment, the data management unit 1140 may monitor a valid data ratio for the flash memory 1110. When the valid data ratio of the flash memory 1110 is higher than or equal to a reference valid rate, the data management unit 1140 may transmit address information, corresponding to the internal trim command and/or the cold data, to the memory controller 1120. In this case, the FTL 1122 may mark the page corresponding to the cold data as being invalid, and the memory controller 1120 may provide information, indicating that the cold data has been deleted, and/or address information, corresponding to the cold data, to the host 1200.

In this case, even before a garbage collection operation is performed on a page corresponding to the cold data marked as being invalid, the memory controller 1120 may provide the host 1200 with information indicating that the cold data has been deleted. For example, regardless of a point in time at which the garbage collection operation is performed, the memory controller 1120 may provide information, indicating that the cold data has been deleted, and/or address information, corresponding to the cold data, to the host 1200.

Continuing to refer to FIG. 3, the host 1200 may include an SSD management unit 1210. The SSD management unit 1210 may manage information on a logical address of the SSD 1100. To this end, the SSD management unit 1210 may include an SSD management table 1220.

The SSD management table 1220 may manage logical addresses in units of pages, and may also manage use state information (hereinafter referred to as "USI") of each page. For example, the USI may indicate whether each page is in a state, in which data is stored, or is an empty state.

In one embodiment of the present invention, the host 1200 may receive information, indicating that the cold data has been deleted, and/or information on a logical address corresponding to the cold data from the memory controller 1120. The SSD management unit 1210 of the host 1200 may change USI of a logical address, corresponding to the cold data in the SSD management table 1220, to an empty state. Accordingly, when a read request for the corresponding cold data is received from the external application AP, the host 1200 may replay that the corresponding data has been deleted. Alternatively, when a write request is received from an external application AP, the host 1200 may assign write-requested data to the storage area in which the cold data was stored.

As described above, the SSD 1100 according to an example embodiment may perform an internal trim operation on cold data when a valid data ratio is higher than or equal to a reference valid ratio. Accordingly, a WAF value may be decreased and performance of the SSD 1100 may be improved. In addition, a garbage collection operation may be performed during idle time to secure a storage area.

Figure 4:
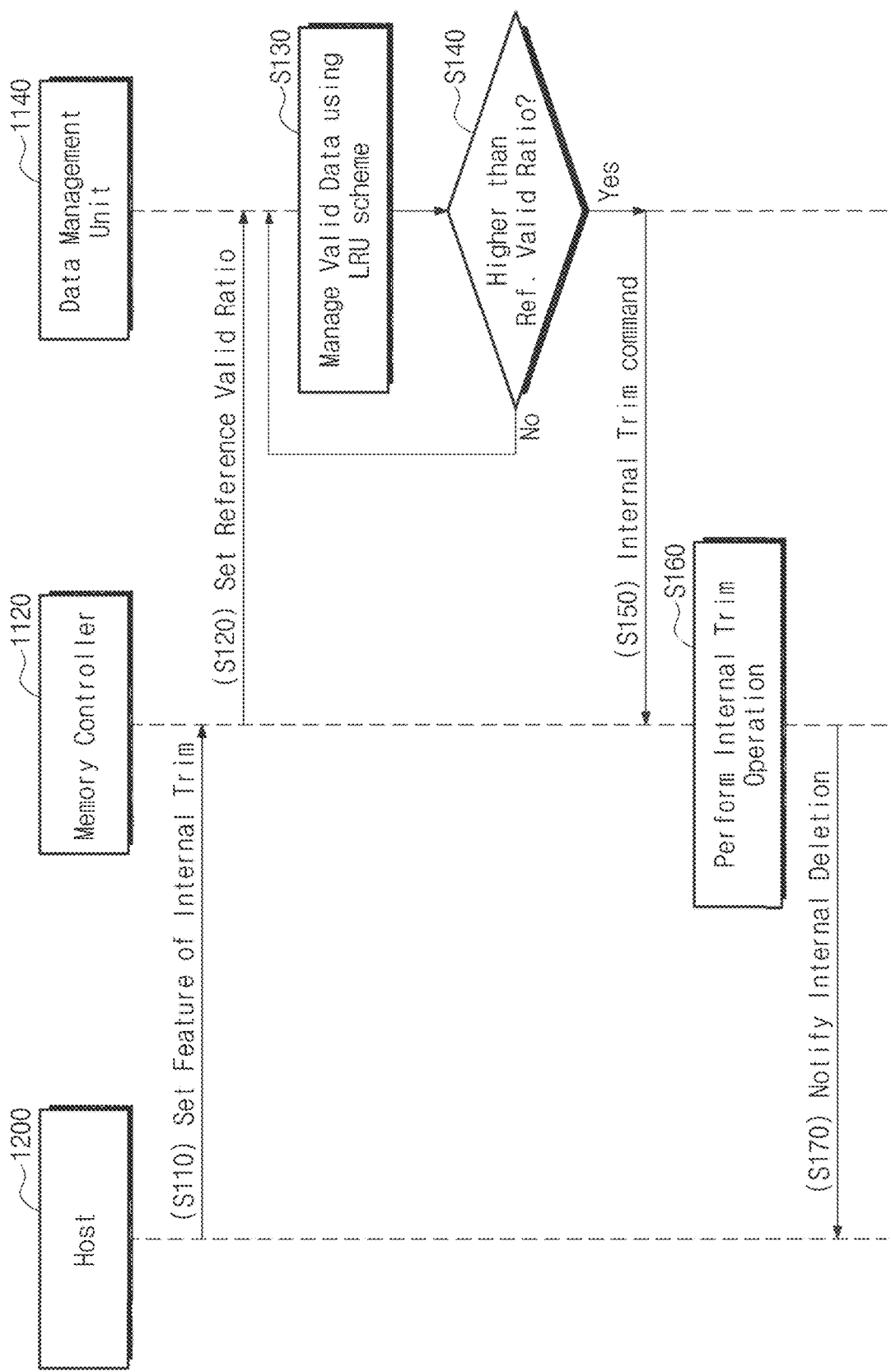
FIG. 4 is a flowchart illustrating an example of an internal trim operation of the storage system of FIG. 3.

FIG. 4 is a flowchart illustrating an example of the internal trim operation of the storage system 1000A of FIG. 3.

In operation S110, the host 1200 may transmit a set feature of internal trim to the memory controller 1120. For example, the set feature of the internal trim may include information on a reference valid ratio for the flash memory 1110.

In operation S120, the memory controller 1120 may set a reference valid ratio and may transmit the set reference valid ratio to the data management unit 1140.

In operation S130, the data management unit 1140 may manage valid data of the flash memory 1110 using an LRU scheme. For example, the data management unit 1140 may sort valid data in order of less recent access time and may set data, accessed least recently, or a plurality of pieces of data, accessed relatively less recently, as cold data.

In operation S140, the data management unit 1140 may determine whether the valid data ratio of the flash memory 1110 is higher than a reference valid rate. When the valid data ratio of the flash memory 1110 is higher than the reference valid ratio, operation S150 may be performed. Meanwhile, when the valid data ratio of the flash memory 1110 is lower than the reference valid ratio, operation S130 may be repeated.

In operation S150, the data management unit 1140 may transmit an internal trim command to the memory controller 1120. In this case, the data management unit 1140 may also transmit information on an address of the cold data.

In operation S160, the memory controller 1120 may perform an internal trim operation in response to the internal trim command. For example, the memory controller 1120 may mark a storage area, corresponding to the cold data, as being invalid. In this case, the storage area marked as being invalid may be used for a garbage collection operation, and the garbage collection operation may be performed during idle time of the SSD 1100.

In operation S170, the memory controller 1120 may transmit internal deletion information to the host 1200. The internal deletion information may include, for example, information indicating that cold data has been deleted and/or information corresponding to the cold data. The host 1200 may recognize that the cold data has been deleted and that the storage area corresponding to the cold data is empty, based on the internal deletion information.

As described above, in the method of operating an SSD according to an example embodiment, an internal trim operation may be performed on cold data when a valid data ratio is higher than or equal to a reference valid ratio. Accordingly, a WAF value may be decreased and operating performance of the SSD 1100 may be improved.

FIGS. 5A to 5C and 6A to 6D are diagrams provided to describe the internal trim operation of the storage system 1000A of FIG. 3 in more detail. FIGS. 5A to 5C illustrate an example of a state in which the valid data ratio of the SSD 1100 is lower than the reference valid ratio, and FIGS. 6 6A to 6D illustrate an example in which an internal trim operation is performed when the valid data ratio of the SSD 1100 is higher than the reference valid ratio.

For ease of description, it will be assumed that the reference valid ratio is 50%. In FIGS. 5A to 5C, it is assumed that data is stored in logical addresses '0' to '4' of the SSD 1100 and a data access to the logical address '2' is least recent. In FIGS. 6A to 6D, it is assumed that write-requested data is stored in a storage area corresponding to the logical address '5' of the SSD 1100.

FIG. 5A illustrates an example of an SSD management table 1220 managed by the host 1200. In a use state information (USI) of the SSD management table 1220, 'W' represents a state in which data is stored, and 'E' represents a state in which data is not stored, for example, an empty state. Referring to the SSD management table 1220, data is stored in a storage area corresponding to logical addresses '0' to '4' of the SSD 1100, and a storage area corresponding to the logical addresses '5' to '10' of the SSD 1100 is in an empty state.

FIG. 5B illustrates an example of an LRU management table 1150 managed by the SSD 1100. In LRU information of the LRU management table 1150, the more recently data is accessed, the smaller numbers are denoted. For example, referring to the LRU management table 1150, an access to data corresponding to the logical address '2' of the SSD 1100 is least recent, and the corresponding data may be set as cold data.

FIG. 5C illustrates an example of a mapping table 1130 managed by the SSD 1100. In write state information (WSI) of the mapping table 1130, 'v' represents a state in which valid data is stored, 'x' represents a state in which invalid data is stored, and 'E' represents a state in which data is not stored, for example, an empty state. For example, referring to the mapping table 1130, logical addresses '0' to '4' of the SSD 1100 correspond to 'Page 0' to 'Page 4,' physical addresses, and data stored in the corresponding pages 'Page 0' to 'Page 4' is valid data.

Referring to FIG. 6A, the host 1200 may assign a storage area, corresponding to logical address '5' of the SSD 1100, as an area for storing write-requested data. Accordingly, the SSD management unit 1210 of the host 1200 may update use state information (USI), corresponding to the logical address '5,' to 'W' in the SSD management table 1220.

Referring to FIG. 6B, the data management unit 1140 of the SSD 1100 may compare a valid data ratio and a referenced valid ratio with each other, and may identify that the valid data ratio exceeds 50%, the reference valid rate. In this case, the data management unit 1140 may update LRU information, corresponding to the logical address '2' accessed least recently, to 'E' in the LRU management table 1150. Then, the data management unit 1140 may transmit an internal trim command and information on the logical address '2' to the memory controller 1120.

Referring to FIG. 6C, the memory controller 1120 of the SSD 1100 receives information on an internal trim command and a logical address '2.' In this case, the memory controller 1120 may update write status information (WSI) of the second page 'Page 2' corresponding to the logical address '2' in the mapping table 1130 to 'x' representing invalidity. Then, the memory controller 1120 may transmit internal deletion information, indicating that the cold data stored in the logical address '2' has been deleted, to the host 1200.

Referring to FIG. 6D, the SSD management unit 1210 of the host 1200 may receive internal deletion information and may recognize that the storage area corresponding to the logical address '2' is empty. In this case, the SSD management unit 1210 may update use state information (USI), corresponding to the logical address '2' in the SSD management table 1220, to 'E' indicating an empty state.

As described above, the storage system 1000 according to an example embodiment may perform an internal trim operation on cold data when a valid data ratio is higher than or equal to a reference valid ratio. Accordingly, a WAF value may be decreased and system performance may be improved.

In FIGS. 3 to 6, it has been described above that the storage device 110 of FIG. 1 is implemented as an SSD. However, this is merely an example and example embodiments are not limited thereto. In an example embodiment, the storage device 110 of FIG. 1 may be implemented as a memory card including a flash memory. For example, the storage device 110 of FIG. 1 may be implemented as a memory card such as a PC (PCMCIA) card, a CF card, an SM (or SMC) card, a memory stick, a multimedia card (MMC, RS-MMC, MMCmicro), a security card (SD, miniSD, microSD, SDHC), a universal flash storage (UFS) device, or the like. In this case, the memory card according to an example embodiment may support an internal trim operation, similarly to that described with reference to FIGS. 3 to 6.

[Storage System Including SSD for Cache]

Figure 7:
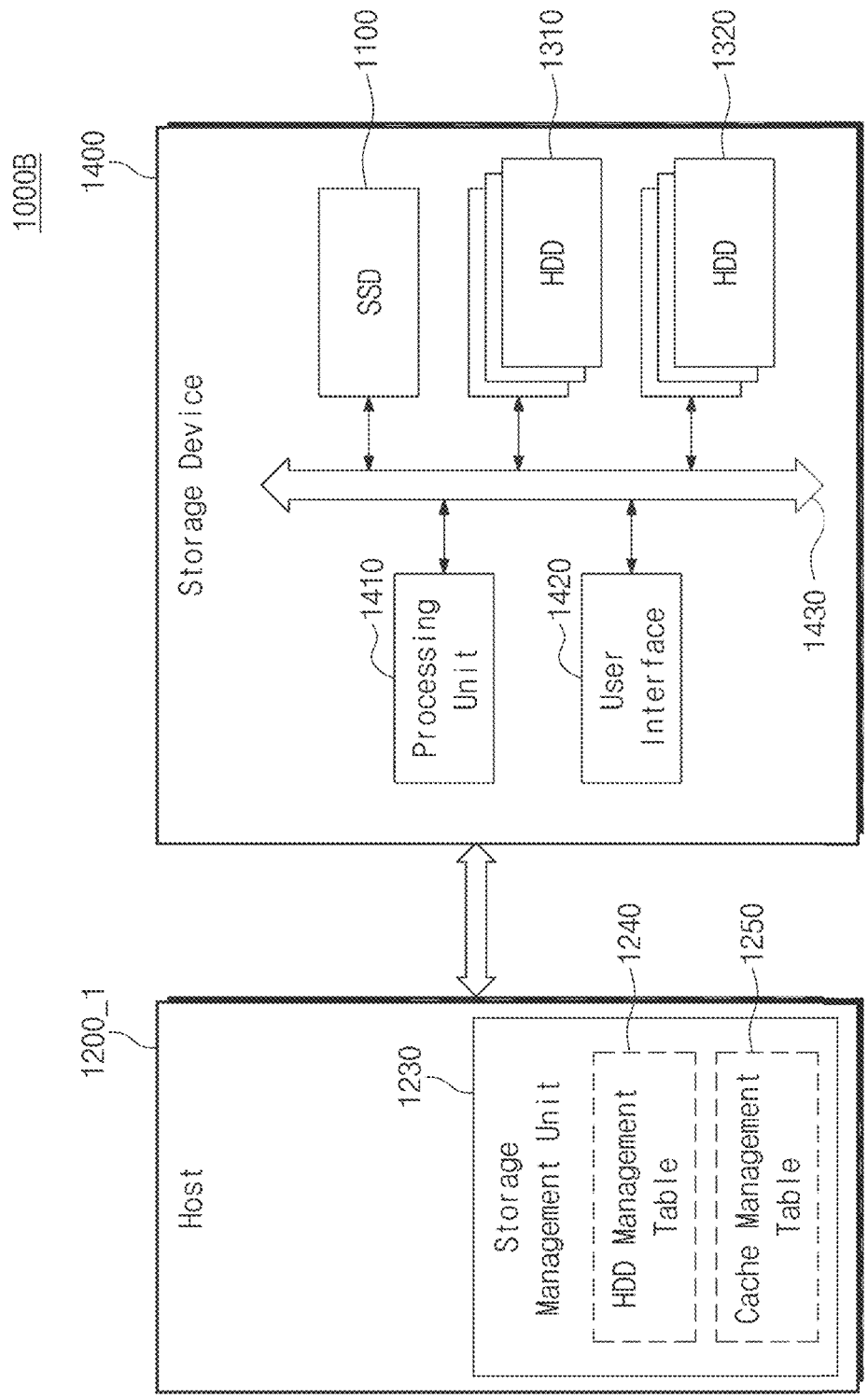
FIG. 7 is a block diagram illustrating a storage system according to an example embodiment.

FIG. 7 is a block diagram illustrating a storage system 1000B according to an example embodiment. FIG. 7 illustrates an example in which the storage device 110 of FIG. 1 is implemented to include an SSD and a memory device, different from the SSD. In FIG. 7, the SSD may be used as a cache for another memory device. Hereinafter, for ease of description, it will be assumed that the storage device 1400 is implemented to include an SSD 1100 and hard disk drives (HDDs) 1310 and 1320. Also, it will be assumed that data stored in the SSD 1100 may be managed in units of pages, data stored in the HDDs 1310 and 1320 may be managed in units of sectors, and a size of the page and a size of the sector are the same. Also, it will be assumed that an internal trim operation of the SSD 1100 is performed in units of pages.

Referring to FIG. 7, the storage system 1000B includes a storage device 1400 and a host 1200, and the storage device 1400 may include an SSD 1100, HDDs 1310 and 1320, a processing unit 1410, a user interface 1420, and a system bus 1430.

In general, the SSD 1100 operates at a high speed, as compared with the HDDs 1310 and 1320. In an example embodiment, the SSD 1100 may be used for a cache or prefetching in the storage device 1400. For example, among pieces of data stored in the HDDs 1310 and 1320, data accessed frequently or data highly likely to be used may be moved to the SSD 1100 and stored therein. Accordingly, as compared with a storage device using only an HDD, the storage device 1400 according to an example embodiment may access data at a high speed.

In an example embodiment, the SSD 1100 of FIG. 7 may be the same as or similar to the SSD 1100 of FIG. 3. For example, the SSD 1100 of FIG. 7 may perform an internal trim operation on cold data when a valid data ratio is higher than or equal to a reference valid ratio. Accordingly, a WAF value may be decreased and performance of the SSD 1100 may be further improved. As a result, as compared with a storage device using only an HDD, the storage device 1400 according to an example embodiment uses the SSD 1100 for a cache to access data at a high speed and may support an internal trim operation on the SSD 1100 to provide further improved performance.

Each of (or alternatively, at least one of) the HDDs 1310 and 1320 may include a platter in which data is written, a spindle motor rotating the platter, and a head reading and writing data. When data is stored in each of (or alternatively, at least one of) the HDDs 1310 and 1320, the spindle motor may rotate the platter and the head may write data in the rotating platter.

In addition, the HDDs 1310 and 1320 may support an overwrite function. For example, the SSD 1100 does not support the overwrite function, whereas the HDDs 1310 and 1320 may support the overwrite function.

In general, manufacturing costs of the HDDs 1310 and 1320 is lower than manufacturing costs of the SSD 1100, so that the HDDs 1310 and 1320 may be provided with higher capacity than the SSD 1100. For example, in an example embodiment, the HDDs 1310 and 1320 may be used for storage of entire data.

The processing unit 1410 may control the overall operation of the storage device 1400. The processing unit 1410 may be connected to the user interface 1420, the SSD 1100, and the HDDs 1310 and 1320 through the system bus 1430. The processing unit 1410 may perform a calculation operation and may store data, generated as a result of the calculation operation, in the SSD 1100 or the HDDs 1310 and 1320.

The user interface 1420 may provide interfacing between the host 1200_1 and the storage device 1400.

The system bus 1430 may electrically connect the SSD 1100 and the HDDs 1310 and 1320 to the processing unit 1410 and the user interface 130. For example, when addresses corresponding to the SSD 1100 are transmitted from the processing unit 1410 to the system bus 1430, the system bus 1430 may form a channel through which data is transmitted between the processing unit 1410 and the HDDs 1310 and 1320.

Continuing to refer to FIG. 7, a host 1200_1 may include a storage management unit 1230. The storage management unit 1230 may manage information on logical addresses of the SSD 1100 and information on logical addresses of the HDDs 1310 and 1320. To this end, the storage management unit 1230 may include an HDD management table 1240 and a cache management table 1250.

The HDD management table 1240 may manage logical addresses of the HDDs 1310 and 1320. For example, the HDD management table 1240 may manage the logical addresses of the HDDs 1310 and 1320 in units of sectors, and may also manage use state information (USI) of each sector. For example, the USI may indicate whether data is stored in each sector of the HDDs 1310 and 1320 or whether the HDDs 1310 and 1320 are in an empty state.

The cache management table 1250 may manage the logical addresses of the SSD 1100 and the logical addresses of the HDDs 1310 and 1320, and may provide a mapping relationship between the logical addresses of the SSD 1100 and the logical addresses of the HDDs 1310 and 1320. For example, when data is stored in the SSD 1100, the cache management table 1250 may manage the logical address of the SSD 1100, in which the data is stored, and the logical addresses of the HDDs 1310 and 1320, in which the data is stored, together.

In an example embodiment, the host 1200_1 may receive information, indicating that cold data has been deleted from the SSD 1100, and/or information on a logical address of the SSD 1100, corresponding to the cold data, from the SSD 1100. The storage management unit 1230 of the host 1200_1 may change use state information (USI) of the logical address of the SSD 1100, corresponding to the cold data in the cache management table 1250, to an empty state.

When a read request for corresponding cold data is received from an external application AP, the host 1200_1 may identify that corresponding data has been deleted from the SSD 1100. In this case, the host 1200_1 may read the corresponding cold data stored in the HDDs 1310 and 1320 based on the HDD management table 1240. Alternatively, when a write request is received from the external application AP, the host 1200_1 may assign write-requested data to a storage area of the SSD 1100 in which the cold data was stored.

As described above, the storage system 1000B according to an example embodiment may use the SSD 1100 for a cache, and the SSD 1100 may support an internal trim operation. Accordingly, the storage system 1000B according to an example embodiment may not only access data at a high speed, but also provide further improved performance because a WAF value is decreased.

FIGS. 8A to 8D include diagrams illustrating an example of the HDD management table 1240, the cache management table 1250, the LRU management table 1150, and the mapping table 1130 managed by the storage system 1000B of FIG. 7. For ease of description, it will be assumed that the HDDs 1310 and 1320 have 1001 sectors, the SSD 1100 has 11 pages, and a sector unit of the HDDs 1310 and 1320 and a page unit of the SSD 1100 match each other. In addition, it will be assumed that data is stored in storage areas corresponding to logical addresses '4' and '5' of the HDDs 1310 and 1320 and the entire SSD 1100 is empty.

Figure 8A:
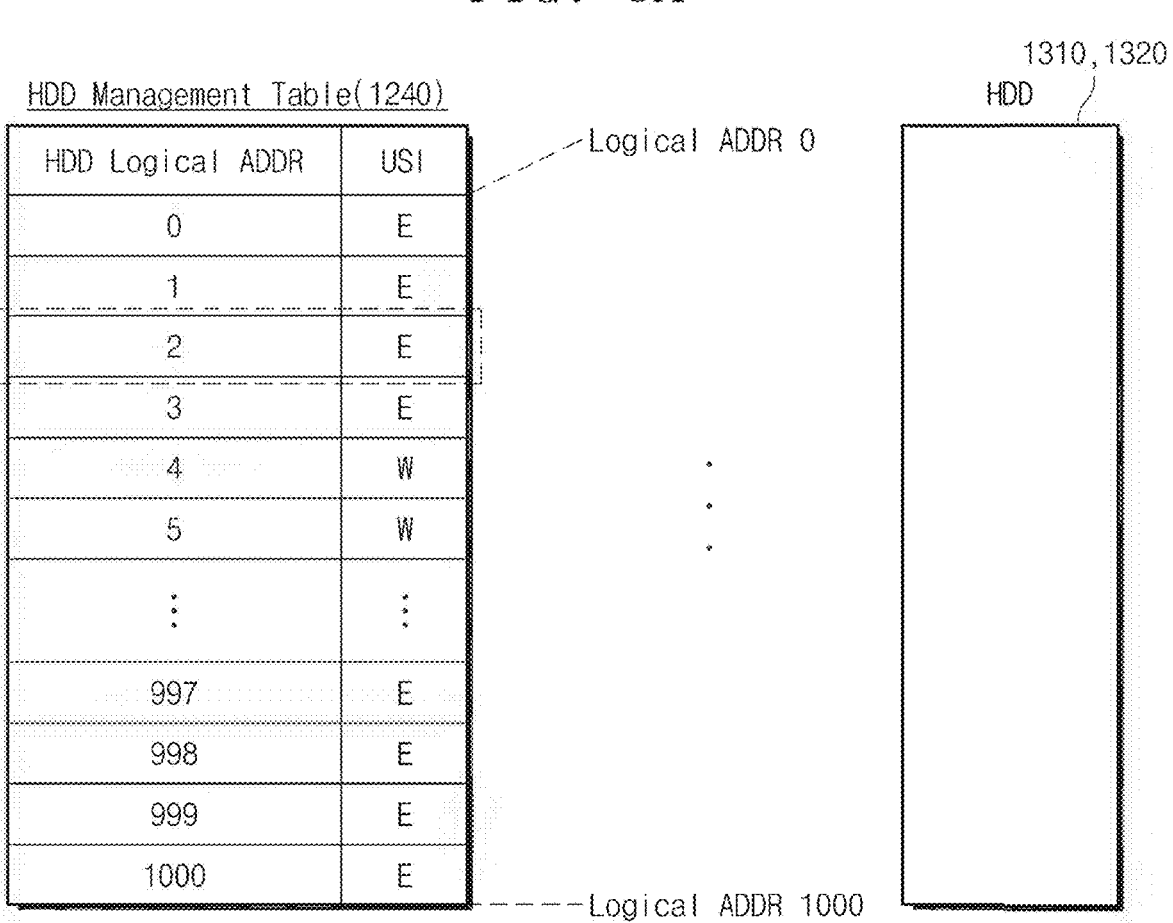

FIG. 8A illustrates an example of the HDD management table 1240 managed by the host 1200_1. In use state information (USI) of the HDD management table 1240, 'W' represents a state in which data is stored, and 'E' represents an empty state in which data is not stored. Referring to the SSD management table 1220, data is stored in storage areas corresponding to logical addresses '0' to '4' of the SSD 1100, and storage areas corresponding to logical addresses '5' to '10' are empty.

Figure 8B:
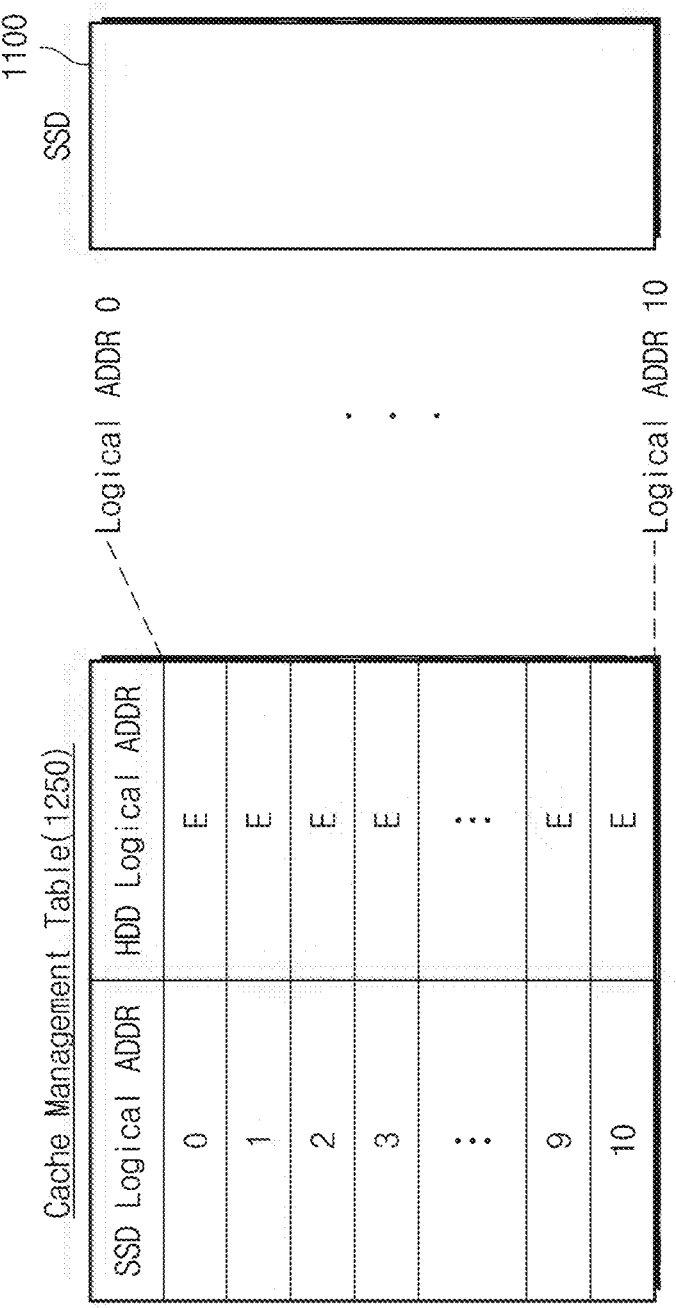

FIG. 8B illustrates an example of the cache management table 1250 managed by the host 1200_1. Since the SSD 1100 is used as a cache, among data stored in the HDDs 1310 and 1320, data requested for access by the host 1200_1 may be copied from the HDDs 1310 and 1320 to the SSD 1100. The cache management table 1250 may manage a logical address of the SSD 1100, to which data has been copied, and a logical addresses of the HDDs 1310 and 1320 corresponding thereto. In the cache management table 1250, 'E' represents a state in which data of each of (or alternatively, at least one of) the HDDs 1310 and 1320 is not copied to the storage area corresponding to the logical address of the SSD 1100, for example, an empty state.

FIGS. 8C and 8D illustrate an example of an LRU management table 1150 managed by the SSD 1100 and an example of a mapping table 1130 managed by the SSD 1100, respectively. The LRU management table 1150 and the mapping table 1130 of FIGS. 8C and 8D are similar to those described in FIGS. 5 and 6, and thus detailed descriptions thereof will be omitted below.

Figure 9:
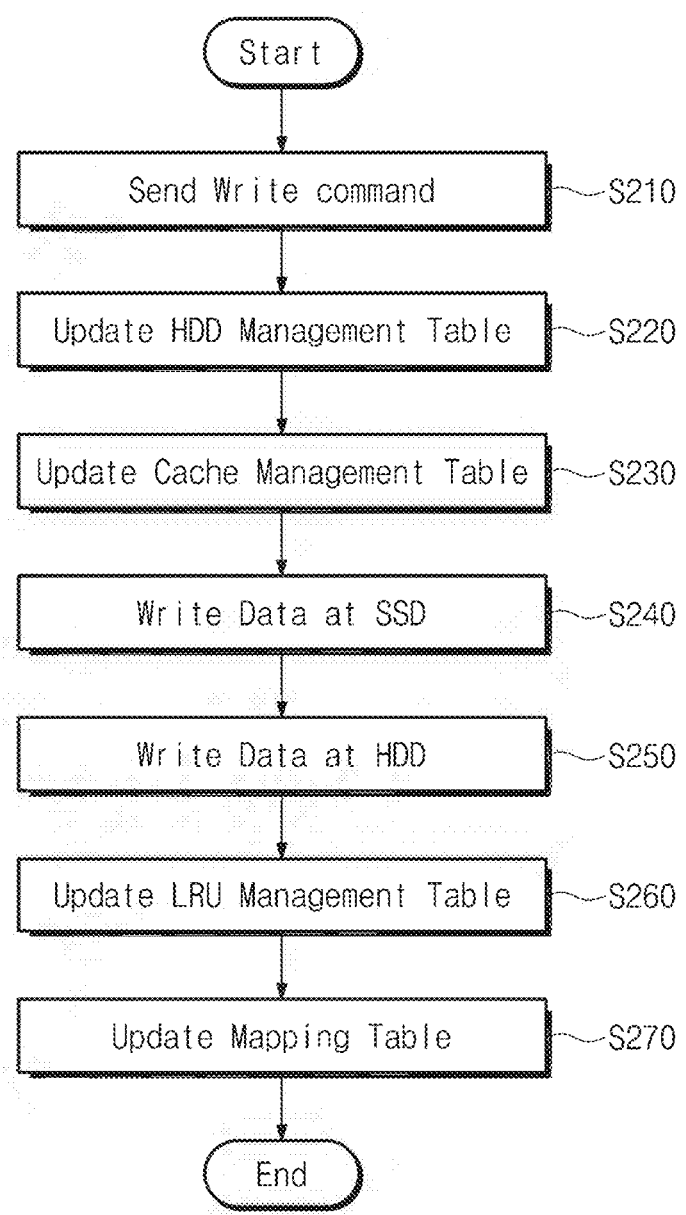
FIG. 9 is a flowchart illustrating an example of a write operation of the storage system of FIG. 7.

FIG. 9 is a flowchart illustrating an example of a write operation of the storage system 1000B of FIG. 7. FIGS. 10A to 10E include diagrams illustrating an example of the write operation of FIG. 9 in more detail. For ease of description, in FIGS. 9 and 10A to 10E, it is assumed that write-requested data is stored in an area corresponding to a logical address '999' of the HDDs 1310 and 1320.

In operation S210, the host 1200_1 may send a write command to the storage device 1400. For example, the host 1200_1 may make a request to store data in a storage area corresponding to the logical address '999' of the HDDs 1310 and 1320.

In operation S220, the storage management unit 1230 of the host 1200_1 may update the HDD management table 1240. For example, as illustrated in FIG. 10A, use state information (USI) corresponding to the logical address '999' of the HDDs 1310 and 1320 may be updated to 'W' in the HDD management table 1240.

In operation S230, the storage management unit 1230 of the host 1200_1 may update the cache management table 1250. For example, as illustrated in FIG. 10B, write-requested data may be managed as cache data and may be stored in an area corresponding to a logical address '0' of the SSD 1100. In this case, logical addresses of the HDDs 1310 and 1320 corresponding to the logical address '0' of the SSD 1100 may be updated to '999' in the cache management table 1250.

Figure 10C:
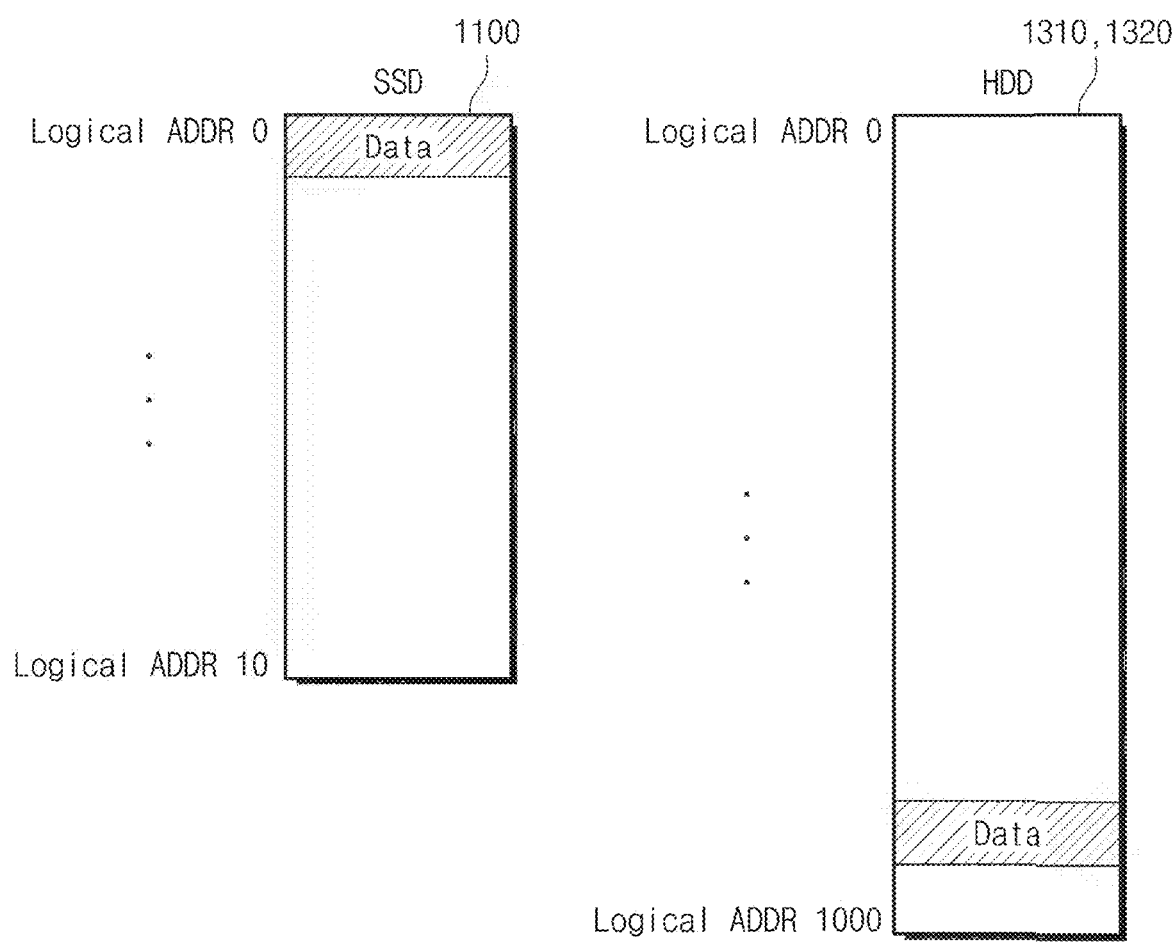

In operation S240, the write-requested data may be stored in an area corresponding to the logical address '0' of the SSD 1100. In operation S250, the write-requested data may be stored in an area corresponding to the logical address '999' of the HDDs 1310 and 1320. In this case, as illustrated in FIG. 10C, a total storage space of the HDDs 1310 and 1320 may be larger than a storage space of the SSD 1100, and data stored in the SSD 1100 may be used for a cache.

In operation S260, the data management unit 1140 of the SSD 1100 may update the LRU management table 1150. For example, as illustrated in FIG. 10D, the logical address '0' of the SSD 1100 was most recently accessed by the host 1200_1. Accordingly, LRU information of the logical address '0' of the SSD 1100 may be updated to '1' in the LRU management table 1150.

In operation S270, the data management unit 1140 of the SSD 1100 may update the mapping table 1130. For example, as illustrated in FIG. 10E, the write-requested data may be stored in the physical address 'Page 0' of the SSD 1100. In this case, the physical address corresponding to the logical address '0' of the SSD 1100 may be updated to 'Page 0' and write status information (WSI) may also be updated to 'v' in the mapping table 1130.

In such a manner, the storage system 1000B according to an example embodiment may store the write-requested data in the SSD 1100 as cache data using the LRU scheme.

Figure 11:
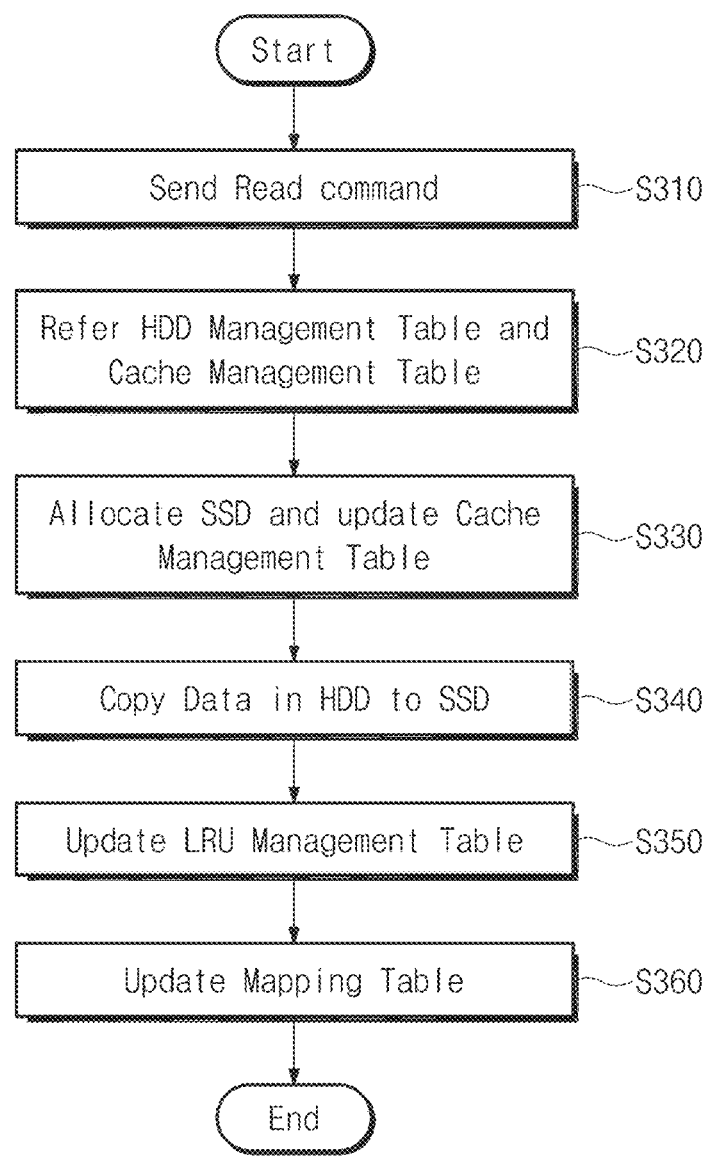
FIG. 11 is a flowchart illustrating an example of a read operation of the storage system of FIG. 7.

FIG. 11 is a flowchart illustrating an example of a read operation of the storage system 1000B of FIG. 7. FIGS. 12A to 12E include diagrams illustrating an example of the read operation of FIG. 11 in more detail. For ease of description, in FIG. 11 and FIGS. 12A to 12E, it will be assumed that a read operation is performed on data stored at a logical address '5' of HDDs 1310 and 1320 in a state in which the SSD 1100 is not assigned to logical address '5' of HDDs 1310 and 1320.

In operation S310, the host 1200_1 may send a read command to the storage device 1400. For example, the host 1200_1 may request a read operation on data stored in an area corresponding to the logical address '5' of the HDDs 1310 and 1320.

In operation S320, the storage management unit 1230 of the host 1200_1 may identify the HDD management table 1240 and the cache management table 1250. For example, as illustrated in FIG. 12A, the storage management unit 1230 may identify that data corresponding to the logical address '5' of the HDDs 1310 and 1320 is stored as valid data, but is not stored in the SSD 1100.

In operation S330, the storage management unit 1230 of the host 1200_1 may assign a read-requested logical address of the HDDs 1310 and 1320 to a logical address of the SSD 1100 which is empty, and may update the cache management table 1250. For example, as illustrated in FIG. 12B, the logical address '1' of the SSD 1100 may be assigned as a cache for a read-requested logical address '5' of the HDDs

1310 and 1320. In this case, the logical address of the SSD 1100 may be updated to '5' in the cache management table 1250.

Figure 12C:
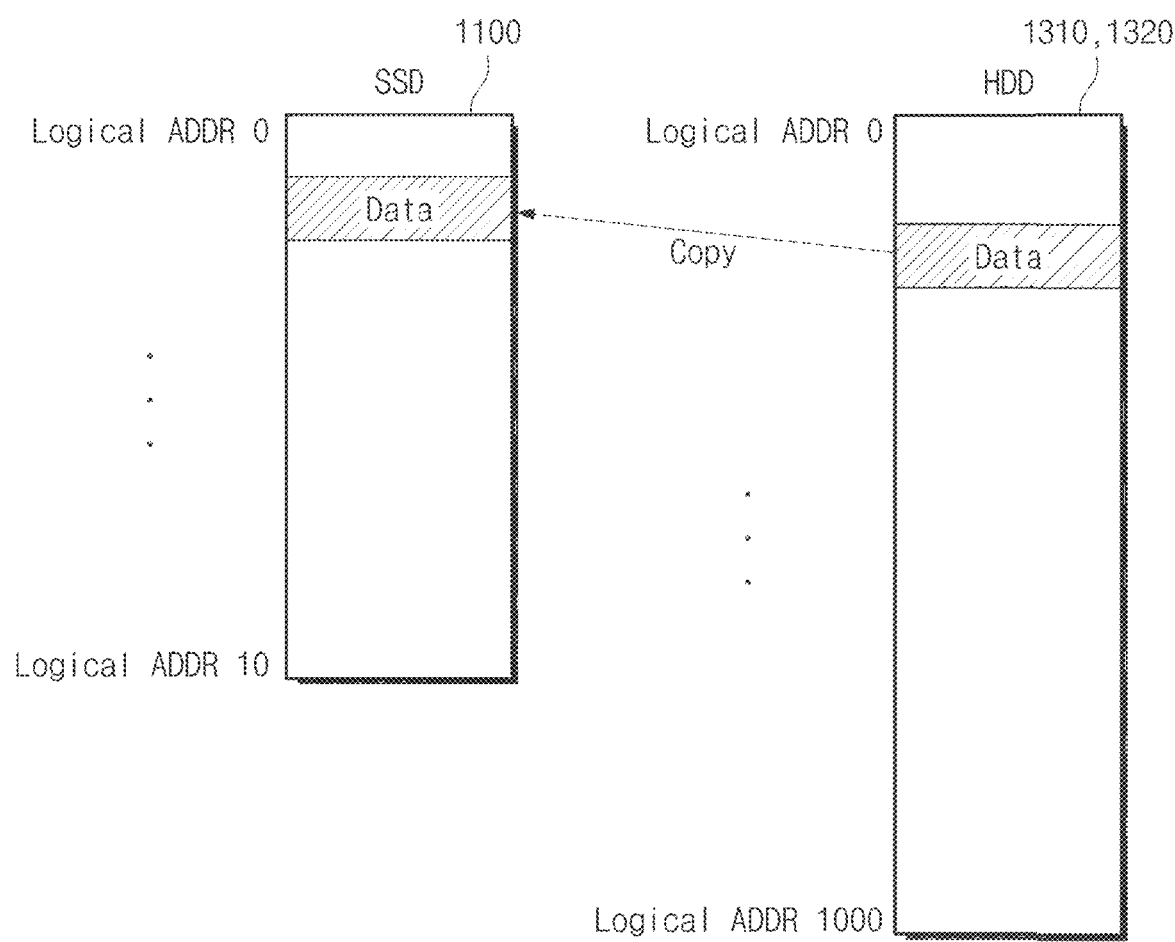

In operation S340, read-requested data may be copied from the HDDs 1310 and 1320 to the SSD 1100. For example, as illustrated in FIG. 12C, data stored in an area corresponding to the read-requested logical address (ADDR) '5' of the HDDs 1310 and 1320 may be copied to an area corresponding to the logical address '1' of the SSD 1100.

In operation S350, the data management unit 1140 of the SSD 1100 may update the LRU management table 1150. For example, as illustrated in FIG. 12D, the logical address '1' of the SSD 1100 was most recently accessed by the host 1200_1. Accordingly, in the LRU management table 1150, the LRU information of the logical address '1' of the SSD 1100 is updated to '1' and the LRU information of the logical address '1' of the SSD 1100 is updated from '1' to '2.'

In operation S360, the data management unit 1140 of the SSD 1100 may update the mapping table 1130. For example, as illustrated in FIG. 12E, read-requested data may be stored in the physical address 'Page 1' of the SSD 1100. In this case, a physical address corresponding to the logical address '1' of the SSD 1100 may be updated to 'Page 1' and write state information (WSI) may also be updated to 'v' in the mapping table 1130.

In such a manner, the storage system 1000B according to an example embodiment may store read-requested data in the SSD 1100 as cache data using an LRU scheme.

Figure 13:
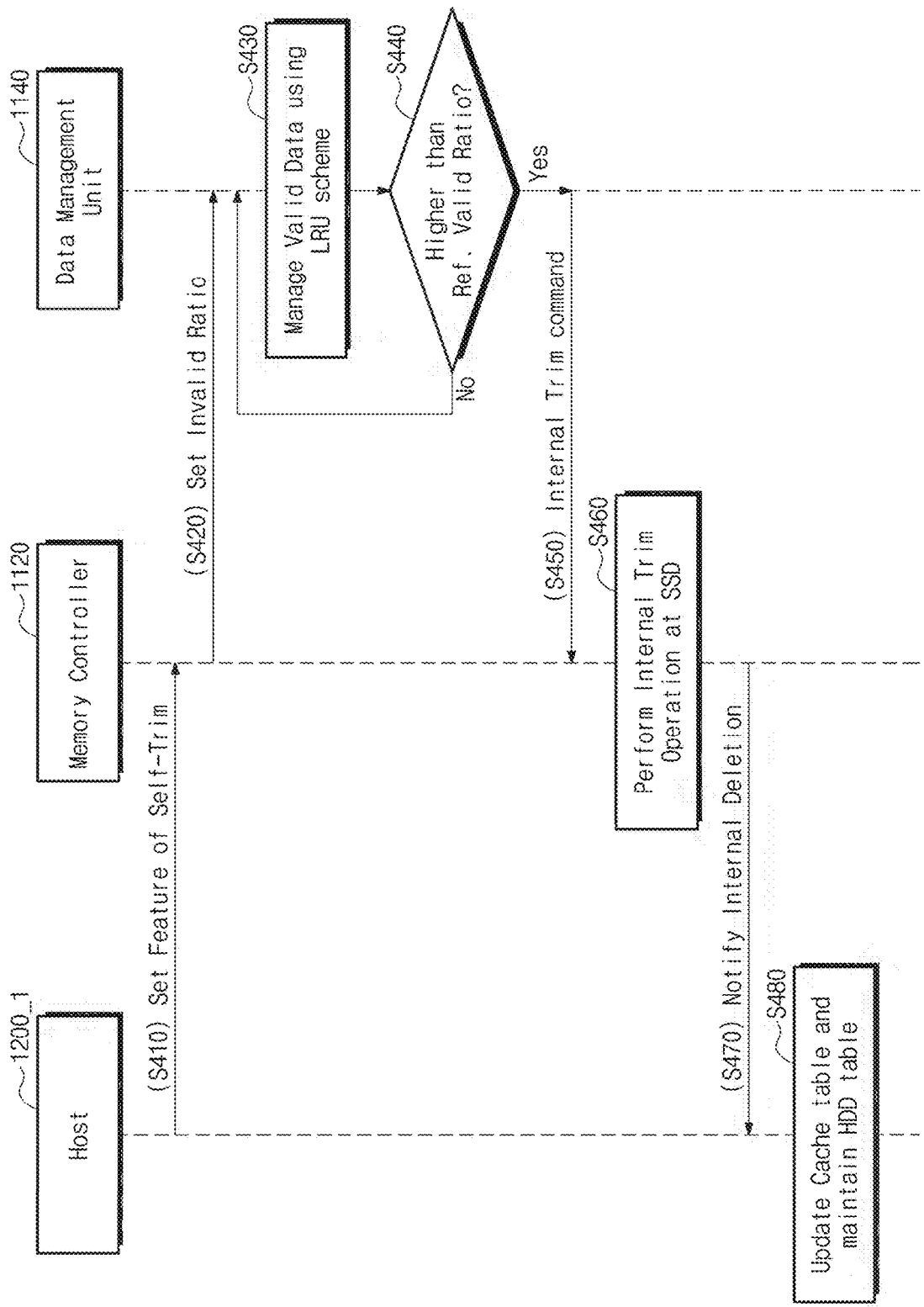
FIG. 13 is a flowchart illustrating an example of an internal trim operation of the storage system of FIG. 7.

FIG. 13 is a flowchart illustrating an example of an internal trim operation of the storage system 1000B of FIG. 7.

In operation S410, the host 1200_1 may send a set feature of internal trim to the storage device 1400. In this case, the set feature of internal trim may be sent to the memory controller 1200 (see FIG. 3) of the SSD 1100 through the system bus 1430. For example, the set feature of internal trim may include information on a reference valid ratio for the flash memory 1110 (see FIG. 3).

In operation S420, the memory controller 1120 may set a reference valid ratio and may send the set reference valid ratio to the data management unit 1140 (see FIG. 3).

In operation S430, the data management unit 1140 may manage valid data of the flash memory 1110 using the LRU scheme.

In operation S440, the data management unit 1140 may determine whether a valid data ratio of the flash memory 1110 is higher than the reference valid rate. When the valid data ratio of the flash memory 1110 is higher than the reference valid ratio, operation S450 may be performed. When the valid data ratio of the flash memory 1110 is lower than the reference valid ratio, operation S430 may be repeated.

In operation S450, the data management unit 1140 may send an internal trim command to the memory controller 1120. In this case, the data management unit 1140 may also send information on an address of cold data.

In operation S460, the memory controller 1120 may perform an internal trim operation on the SSD 1100 in response to the internal trim command. For example, the memory controller 1120 may mark a storage area corresponding to the cold data, among storage areas of the SSD 1100, as being invalid. In this case, the storage area marked as being invalid may be used for a garbage collection operation of the SSD 1100. The cold data stored in the HDDs 1310 and 1320 may be continuously maintained as valid data.

In operation S470, the memory controller 1120 of the SSD 1100 may send internal deletion information to the host 1200_1.

In operation S480, the host 1200_1 may recognize that cold data stored in the SSD 1100 has been deleted based on the internal deletion information and may update the cache management table 1250. In this case, the cold data may be continuously stored in the HDDs 1310 and 1320, so that the HDD management table 1240 may be maintained as it is.

As described above, the internal trim operation of the storage system 1000B according to an example embodiment may be applied even when the SSD 1100 is used for a cache. Accordingly, a data access speed may be further increased and a WAF value may be decreased, resulting in further improved performance.

FIGS. 14A to 14G include diagrams provided to describe the internal trim operation of the storage system 1000B of FIG. 7 in more detail. For ease of description, it will be assumed that the reference valid ratio is 90% and the write-requested data is stored at the logical address '3' of the HDDs 1310 and 1320. Also, it will be assumed that the SSD 1100 is assigned to write-requested data, so that the valid data ratio of the SSD 1100 is higher than the reference valid rate.

FIG. 14A illustrates an example of the HDD management table 1240 managed by the host 1200_1. The host 1200_1 may assign a storage area, corresponding to the logical address '3' of the HDDs 1310 and 1320, as an area for storing write-requested data. Accordingly, use state information (USI) corresponding to the logical address '3' may be updated to 'W' in the HDD management table 1240.

FIG. 14B illustrates an example of a cache management table 1250 managed by the host 1200_1. Write-requested data may be managed as cache data and may be stored in an area corresponding to the logical address '9' of the SSD 1100. In this case, a logical address of the HDDs 1310 and 1320 corresponding to the logical address '9' of the SSD 1100 may be updated to '3' in the cache management table 1250.

FIG. 14C illustrates an example of an LRU management table 1150 managed by the SSD 1100. As a storage area corresponding to the logical address '9' of the SSD 1100 is assigned as a cache area, the data management unit 1140 of the SSD 1100 may update the LRU management table 1150. For example, LRU information of the logical address '9' of the SSD 1100 may be updated to '1' in the LRU management table 1150.

The data management unit 1140 of the SSD 1100 may compare the valid data ratio with the standard valid rate and may identify that the valid data ratio exceeds 90%, the reference valid ratio. In this case, the data management unit 1140 may update LRU information, corresponding to the logical address '0' of the SSD 1100 accessing data least recently, 'E' in the LRU management table 1150. Then, the data management unit 1140 may send information on the internal trim command and the logical address '9' to the memory controller 1140.

Referring to FIG. 14D, the memory controller 1120 of the SSD 1100 may receive an internal trim command and information on a logical address '9.' In this case, the memory controller 1120 may update write state information (WSI) of 'Page 0,' corresponding to the logical address '0' of the SSD 1100, to 'x' representing invalidity in the mapping table 1130. Then, the memory controller 1120 may send internal deletion information, indicating that the cold data stored in the logical address '0' of the SSD 1100 has been deleted, to the host 1200_1.

Figure 14E:
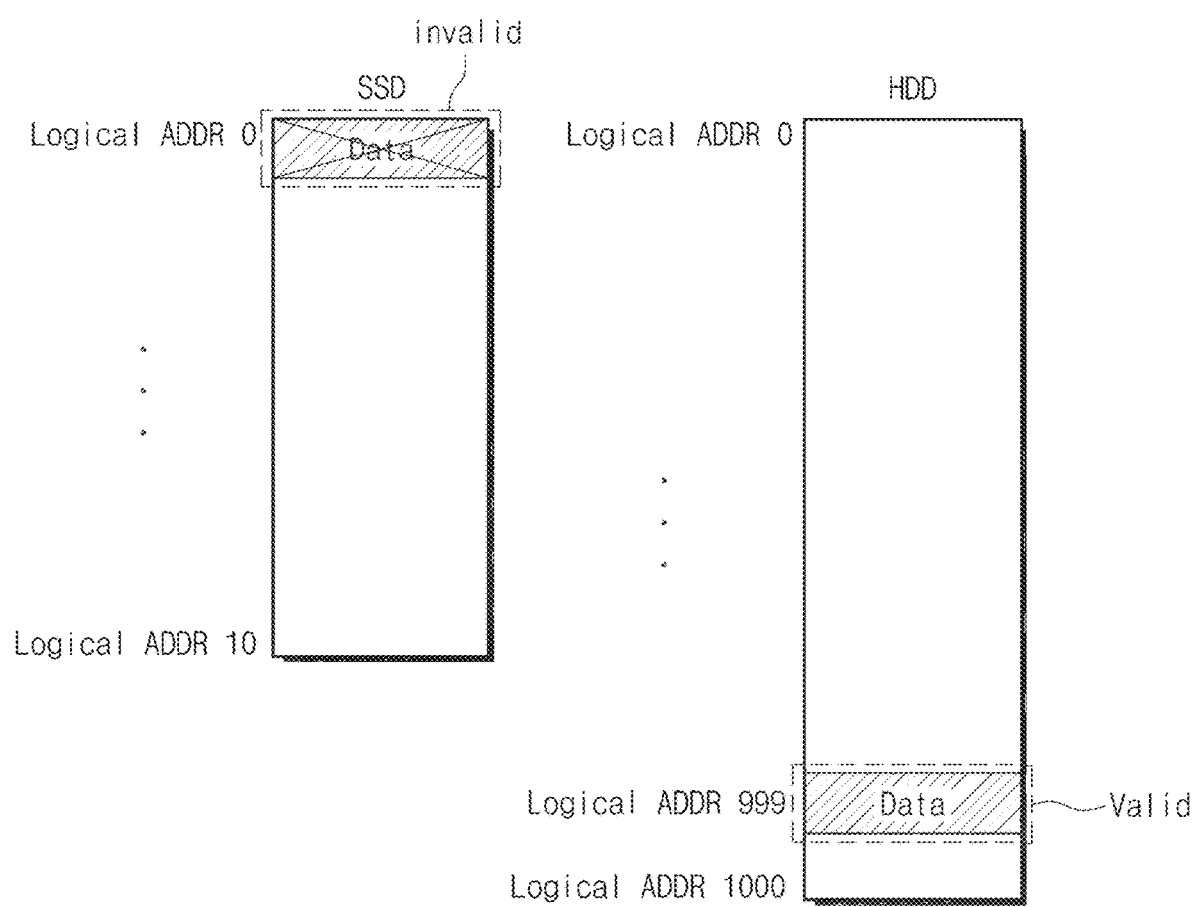

As illustrated in FIG. 14E, the cold data may be invalidated only in the SSD 1100 and may still be stored in the area corresponding to the logical address '999' of the HDDs 1310 and 1320.

Referring to FIG. 14F, the storage management unit 1230 of the host 1200 may receive the internal deletion information and may recognize that a storage area corresponding to the logical address '0' of the SSD 1100 is empty. Accordingly, in the cache management table 1250, a logical address of the HDDs 1310 and 1320 corresponding to the logical address '0' of the SSD 1100 may be updated to 'E' indicating that the HDDs 1310 and 1320 are empty. As illustrated in FIG. 14G, the cold data is still stored in the area corresponding to the logical address '999' of the HDDs 1310 and 1320, so that the HDD management table 1240 may be maintained.

As described above, the storage system 1000B according to an example embodiment may use the SSD 1100 for a cache, and the SSD 1100 may support an internal trim operation. Accordingly, the storage system 1000B according to an example embodiment may not only access data at a high speed, but also provide improved performance because a WAF value is decreased.

In the above-described example embodiments, it has been assumed that the storage device 1400 of FIG. 7 includes an SSD and an HDD. However, this is merely an example and example embodiments are not limited thereto. According to example embodiments, the storage device 1400 may be implemented to include another type of memory device, rather than the HDD. According to example embodiments, the storage device 1400 may include a plurality of memory devices and an SSD, and the SSD may be used as a cache for at least one of the plurality of memory devices.

Figure 15:
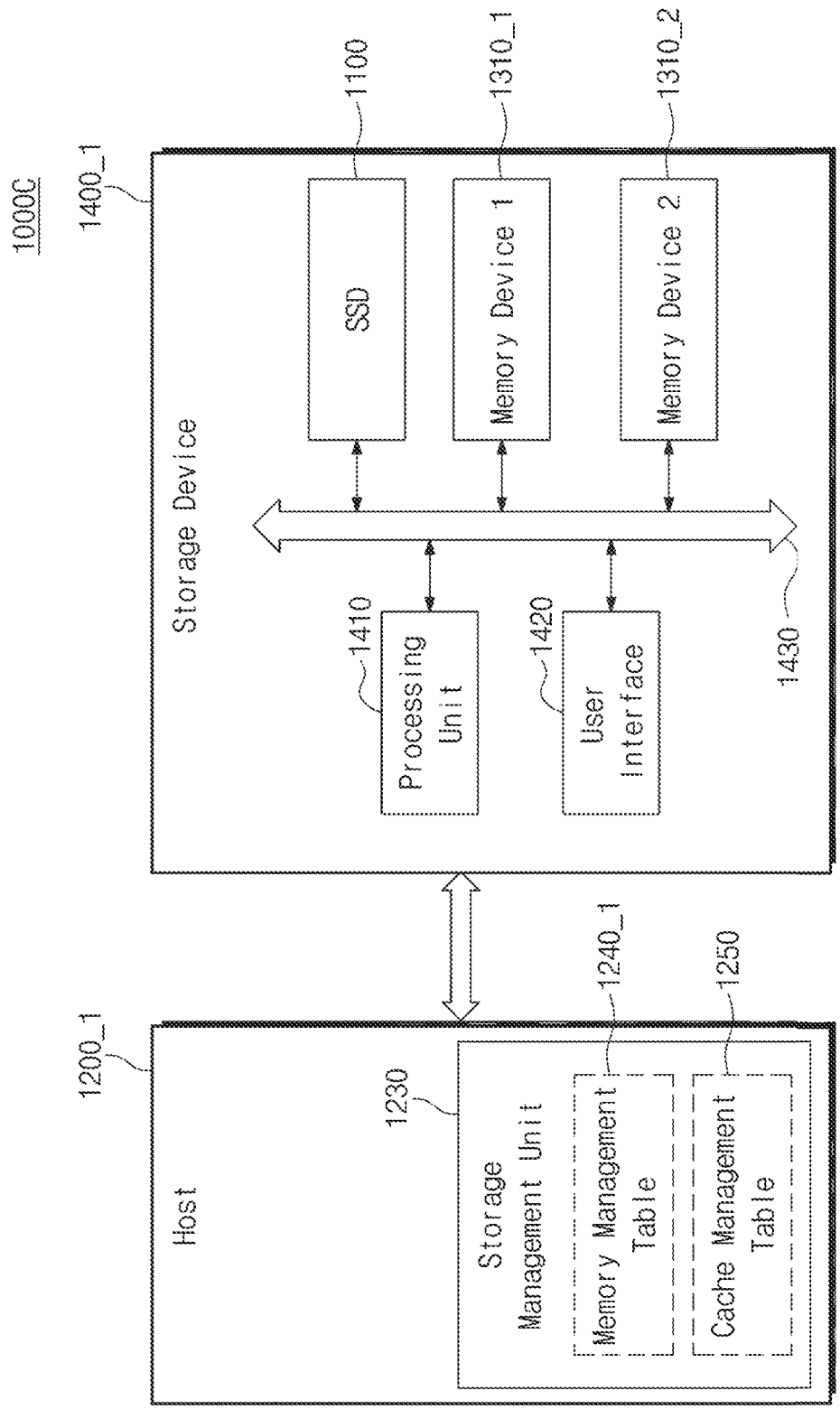
FIG. 15 is a block diagram illustrating a storage system according to an example embodiment.

A more detailed description will be provided with reference to FIG. 15. Referring to FIG. 15, the storage device 1400_1 may be implemented to include an SSD 1100, a first memory device 1310_1, and a second memory device 1320_2. The first memory device 1310_1 and the second memory device 1310_2 may be the same type of memory devices. Alternatively, the first memory device 1310_1 and the second memory device 1310_2 may be different types of memory devices.

For example, the first memory device 1310_1 may be an HDD, and the second memory device 1310_2 may be a memory device, different from the HDD. For example, the second memory device 1310_2 may be a nonvolatile memory device including a flash memory, a resistive random access memory (RRAM), a phase-change memory (PRAM), and a magnetoresistive random access memory (MRAM), a ferroelectric random access memory (FRAM), a spin transfer torque random access memory (STT-RAM), or the like.

As another example, the first memory device 1310_1 may be a nonvolatile memory device, and the second memory device 1310_2 may be a nonvolatile memory device, different from the first memory device 1310_1.

As another example, both the first memory device 1310_1 and the second memory device 1310_2 may be the same type of nonvolatile memory devices.

In the above-described example embodiments, it has been described that a plurality of pieces of data accessed least recently or accessed relatively less recently are set as cold data using an LRU scheme. However, this is merely an example, and example embodiments are not limited thereto. According to example embodiments, the cold data may be set in various manners. For example, a user may set important data as special data (hereinafter referred to as "SD"), and the special data SD may not be set as cold data regardless of access time. This will be described below in more detail in FIGS. 16 and 17.

[Storage Systems Capable of Setting Cold Data]

Figure 16:
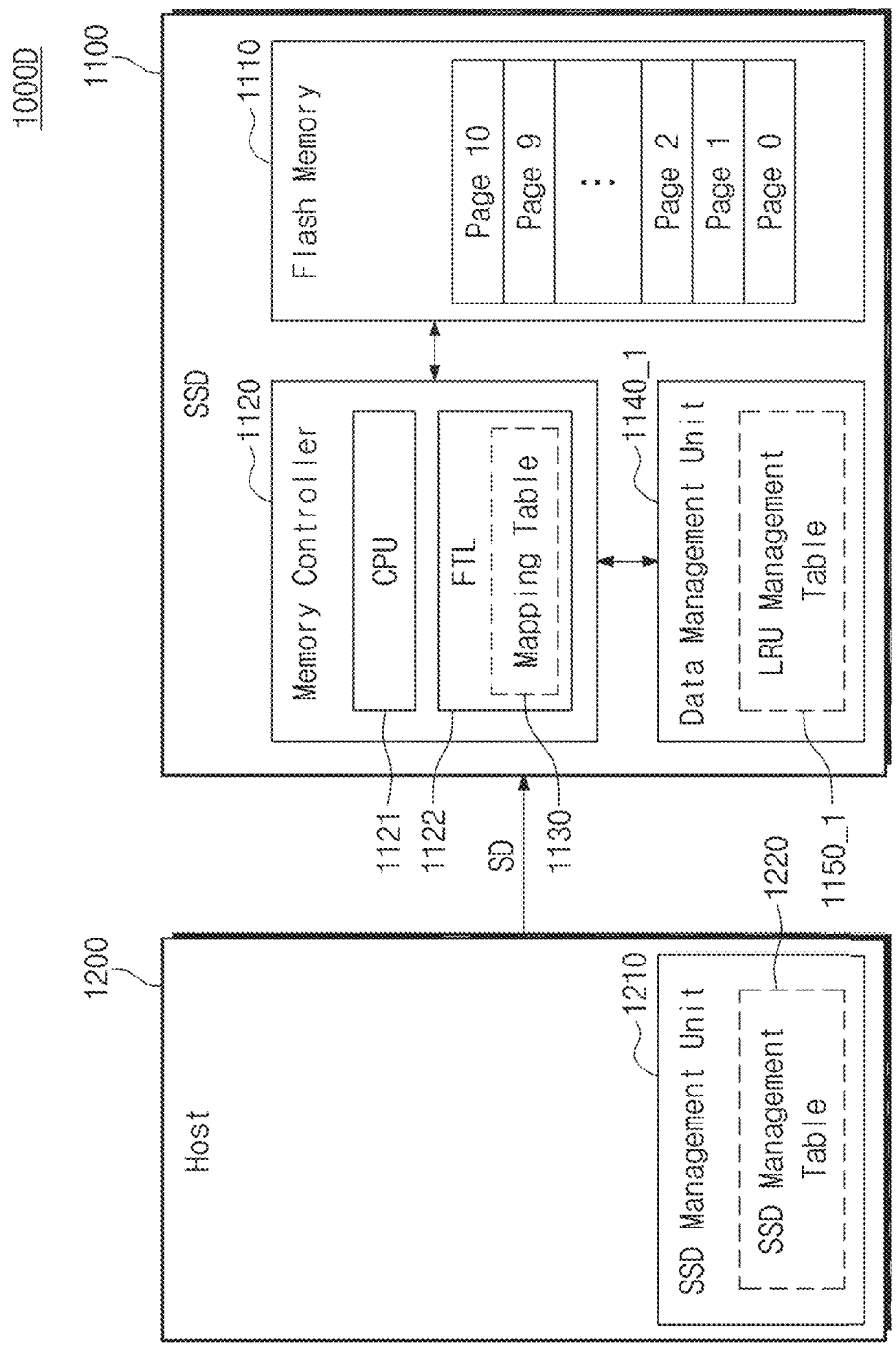
FIG. 16 is a diagram illustrating an example of an LRU management table of the storage system 1000C of FIG. 15.

FIG. 16 is a block diagram illustrating a storage system 1000D according to an example embodiment. FIG. 17 is a diagram illustrating an example of an LRU management table 1150_1 of the storage system 1000D of FIG. 16. The storage system 1000D and the LRU management table 1150_1 of FIGS. 16 and 17 are similar to the storage system 1000A and the LRU management table 1150 of FIGS. 3 to 6. Therefore, the same or similar components are denoted by the same or similar reference numerals, and repetitive descriptions will be omitted below.

Referring to FIG. 16, a host 1200_2 of the storage system 1000D may send information on special data SD to an SSD 1100_1. The special data SD may be data continuously stored in the SSD 1100_1, regardless of an internal trim operation. For example, the special data SD may include information such as security data, setting data, or the like. The data management unit 1140_1 of the SSD 1100_1 may receive the information on the special data SD, and may exclude the special data SD from cold data.

Referring to FIG. 17, the LRU management table 1150_1 may further include SDI information indicating whether data stored in an area corresponding to a logical address of the SSD 1100 is special data SD. For example, the special data SD may be stored in an area corresponding to a logical address '2' of the SSD 1100, and SDI information on the corresponding area may be marked as 'S.' The 'S' may indicate that the corresponding data is the special data SD, and 'N' may indicate that the corresponding data is general data.

An area of the SSD 1100, in which the special data SD is stored, may be excluded from an internal trim operation. For example, as illustrated in FIG. 16, even when an access to the logical address '2' of the SSD 1100 storing the special data SD is least recent, the logical address '2' of the SSD 1100 storing the special data SD may be excluded from a target of the internal trim operation and the internal trim operation may be performed on a logical address '1' at which general data is stored.

As described above, a portion of data may be excluded from the internal trim operation according to user's setting, and thus important data may be stably retained.

As described above, a storage device according to example embodiments may perform an internal trim operation on cold data when a valid data ratio is higher than a reference valid ratio. Thus, a WAF value may be described and performance of the storage device may be improved.

Any of the elements and/or functional blocks disclosed above may include or be implemented in processing circuitry such as hardware including logic circuits; a hardware/ software combination such as a processor executing software; or a combination thereof. For example, the memory controller 112, data management unit 1140, SSD management unit 1210, and processing unit 1410, may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While example embodiments have been shown and described above, it will be apparent to those skilled in the art that modifications and variations could be made without departing from the scope of the present inventive concept as defined by the appended claims.

What is claimed is:

1. A storage device comprising:
   a memory device; and
   a solid state drive used as a cache memory for the memory device, the solid state drive including,
      a storage unit comprising a plurality of nonvolatile memory cells,
      a data management unit configured to,
         manage pieces of data, stored in the storage unit, in order of less recent access time, and
         set at least one of the pieces of data, stored in the storage unit, as cold data based on a data access point in time, and send an internal trim command for the cold data to a memory controller in response to a valid data ratio of the storage unit being higher than a reference valid ratio, and
      the memory controller configured to,
         perform an internal trim operation on the cold data, among pieces of data stored in the solid state drive, based on the internal trim command, and
         send internal deletion information, indicating the cold data has been deleted, to a host,
      wherein among pieces of data stored in the storage unit, special data set by the host is excluded from a setting target of the cold data, regardless of a data access point in time.

2. The storage device of claim 1, wherein
   the memory controller comprises
      a flash translation layer configured to translate a logical address of each storage area of the storage unit into a physical address, and
      a mapping table comprising mapping information between the logical address of each storage area and the physical address and write state information, and
   the flash translation layer is further configured to update write state information corresponding to the cold data to an invalid state based on the internal trim command.

3. The storage device of claim 2, wherein
   the memory controller is configured to cause a garbage collection operation to be performed on the cold data, in which the write state information is in an invalid state,
   during idle time.

4. The storage device of claim 1, wherein
   the data management unit comprises a least recently used (LRU) management table comprising a logical address of each storage area of the storage unit and LRU information, and
   the data management unit is configured to set at least one piece of data, accessed less recently than a threshold recency, as the cold data based on the LRU information of the LRU management table.

5. The storage device of claim 1, wherein
   the data management unit is configured to receive the valid data ratio of the storage unit from the host and set the received valid data ratio.

6. A storage system comprising:
   a storage device comprising a plurality of nonvolatile memory cells; and
   a host configured to send a reference valid ratio to the storage device,
   wherein the storage device is configured to perform an internal trim operation on cold data stored based on a least recently used (LRU) scheme in response to the reference valid ratio of the storage device being higher than or equal to a valid data ratio, and send information, indicating that the cold data of the internal trim operation has been deleted, to the host,
   wherein among pieces of data stored in the storage device, special data set by the host is excluded from a setting target of the cold data, regardless of a data access point in time.

7. The storage system of claim 6, wherein
   the storage device comprises:
      a storage unit comprising a plurality of flash memory cells;
      a memory controller configured to control the storage unit; and
      a data management unit configured to manage pieces of data, stored in the storage unit, in order of less recent access time.

8. The storage system of claim 7, wherein
   the data management unit is configured to set at least one of the pieces of data, stored in the storage unit, as the cold data based on a data access point in time, and send an internal trim command for the cold data to the memory controller in response to the valid data ratio of the storage unit being higher than or equal to the reference valid ratio, and
   the memory controller is configured to perform an internal trim operation on the cold data based on the internal trim command.

9. The storage system of claim 8, wherein
   the memory controller comprises:
      a flash translation layer configured to translate a logical address of each storage area of the storage unit into a physical address; and
      a mapping table comprising mapping information between the logical address of each storage area and the physical address and write state information, and
   the flash translation layer is configured to update the write state information corresponding to the cold data to an invalid state based on the internal trim command.

10. The storage system of claim 9, wherein
the memory controller is configured to send internal deletion information, indicating that the cold data in which the write state information is invalidated has been deleted, to the host.

11. The storage system of claim 10, wherein
the host comprises a solid state drive (SSD) management table comprising a logical address of each storage area of the storage unit and use state information, and
the host is configured to update the use state information of the SSD management table, corresponding to the cold data, to an empty state based on the internal deletion information received from the memory controller.

12. The storage system of claim 8, wherein
the data management unit comprises an LRU management table comprising a logical address of each storage area of the storage unit and LRU information, and
the data management unit is configured to set at least one piece of data, accessed less recently than a threshold recency, as the cold data based on the LRU information of the LRU management table.

13. The storage system of claim 7, wherein
the storage device further comprises
a memory device, and
a system bus configured to provide a data transmission path between the memory device and the storage unit, and
the storage unit is used as a cache memory for the memory device.

14. The storage system of claim 13, wherein
the memory device is a hard disk drive (HDD), and
the host comprises
an HDD management table comprising a logical address of each storage area of the HDD and use state information, and
a cache management table comprising logical address information of each storage area of the storage unit and logical address information of each storage area, to which the storage unit is assigned, among storage areas of the hard disk drive.

15. The storage system of claim 14, wherein
in response to logical address information on cold data being a target of the internal trim operation being received from the memory controller, the host is configured to update a logical address of the storage unit corresponding to the cold data in the cache management table to an empty state and maintain use state information of a storage area of the hard disk drive corresponding to the cold data in the HDD management table.

16. A method of operating a storage device including a plurality of nonvolatile memory cells, the method comprising:
setting a reference valid ratio;
sorting pieces of valid data, among pieces of data stored in the storage device, based on a data access point in time;
performing an internal trim operation on cold data being data accessed less recently than a threshold recency, among the pieces of data stored in the storage device, in response to a valid data ratio of the storage device being higher than or equal to the reference valid ratio; and
sending internal deletion information, indicating the cold data has been deleted, to a host,
wherein among pieces of data stored in the storage device, special data is excluded from a setting target of the cold data, regardless of the data access point in time.

17. The method of claim 16, further comprising:
updating write state information of the cold data to an invalid state.

18. The method of claim 16, wherein
the storage device comprises a solid state drive and a hard disk drive, and
the sorting the pieces of valid data based on the data access point in time comprises
identifying whether data requested to be accessed from the host is stored in the solid state drive, and
updating least recently used (LRU) information on the data requested to be accessed in response to the data requested to be accessed being stored in the solid state drive.

19. The method of claim 18, wherein the sorting the pieces of valid data based on the data access point in time further comprises:
assigning the data requested to be accessed to the solid state drive and copying the data requested to be accessed from the hard disk drive to the solid state drive in response to the data requested to be accessed not being stored in the solid state drive.

* * * * *